3,270,015
1,2-DIHYDRO-1-HYDROXY-1,3,5-TRIAZINES
Joseph J. Ursprung, Portage, Mich., assignor to The Upjohn Company, Kalamazoo, Mich., a corporation of Delaware
No Drawing. Filed July 1, 1965, Ser. No. 468,945
29 Claims. (Cl. 260—247.5)

This application is a continuation-in-part of copending application Serial No. 274,315, filed April 19, 1963, and now abandoned.

This invention relates to novel dihydrotriazines and to processes for their preparation, and is more particularly concerned with novel 1,2-dihydro-1-hydroxy-1,3,5-triazines which can be represented by the formula:

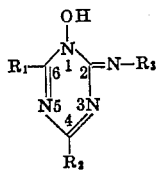

I wherein $R_1$ is selected from the group consisting of hydrogen, lower alkyl, lower alkenyl, lower alkoxyalkyl, lower cycloalkyl, lower aryl, lower alkaryl, lower aralkyl, lower alkaralkyl, lower alkoxyaralkyl, and lower haloaralkyl; wherein $R_2$ is selected from the group consisting of di-lower-alkylamino, di-lower-alkenylamino, N-lower alkyl-lower-alkenylamino, and the heterocyclic moieties, aziridinyl, azetidinyl, pyrrolidinyl, piperidino, hexahydroazepinyl, heptamethylenimino, octamethylenimino, and morpholino, each of said heterocyclic moities having attached as substituents on carbon atoms thereof zero to 3 lower alkyls, inclusive, the nitrogen atom of $R_2$ being the point of attachment of $R_2$ to the ring in said formula; and wherein $R_3$ is selected from the group consisting of hydrogen, lower alkyl, lower alkenyl, lower cycloalkyl, lower aryl, and lower aralkyl. $R_1$ and $R_3$ can be the same or different. When $R_2$ is di-lower-alkylamino or di-lower-alkenylamino, the alkyls or the alkenyls therein can be the same or different. When $R_2$ is a heterocyclic moiety, the alkyls which can be attached thereto can all be different or any two or all of them can be alike. When $R_1$ and/or $R_3$ are alkyl, they can be the same as or different than any of the alkyls associated with $R_2$.

The novel 1,2-dihydro-1-hydroxy-1,3,5-triazines of the invention can be represented by formulas other than Formula I. Among these is:

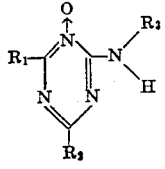

IA

Formula IA is tautomeric with Formula I. For convenience, reference will be made hereinafter only to Formula I. It is to be understood, however, that the novel compounds of this invention are likely to be mixtures of tautomeric forms, the compositions of which are dependent on such factors as the nature of $R_1$, $R_2$, and $R_3$, and the environment. In some instances, one form or another may predominate.

Examples of lower alkyl are methyl, ethyl, propyl, butyl, pentyl, hexyl, heptyl octyl, and isomeric forms thereof. Examples of lower alkenyl are vinyl, allyl, propenyl, 2-butenyl, 3-methyl-2-butenyl, 3-pentenyl, -2,3-dimethyl-2 methylpropenyl, 1-methylallyl, 2-methylallyl (methallyl), 2-butenyl (crotyl), 3-butenyl, 1,2-dimethylallyl, 1,1-di methylallyl, 2-ethylallyl, 1-methyl-2-butenyl, 2-methyl-2-butneyl, 3-methyl-2-butenyl, 3-pentenyl, 2,3-dimethyl-2-butenyl, 1,1,2-trimethylallyl, 1,3-dimethyl-2-butenyl, 1-ethyl - 2 - butenyl, 4 - methyl - 2 - pentenyl, 2 - ethyl-2 - pentenyl, 4,4 - dimethyl - 2 - pentenyl, 2 - heptenyl, 2 - octenyl, 5 - octenyl, 1,4 - dimethyl - 4 - hexenyl, and the like. Examples of lower alkoxyalkyl are 2-methoxyethyl, 2 - ethoxyethyl, 2 - butoxyethyl, 2-hexyloxyethyl, 2 - octyloxyethyl, 2 - methoxypropyl, 3-methoxypropyl, 3 - propoxypropyl, 2 - methoxy butyl, 3 - ethoxybutyl, 4 - butoxybutyl, 2 - ethoxyhexyl, 3-mehoxy - 3 - methylpentyl 4 - methoxyoctyl, and the like. Examples of lower cycloalkyl are cyclopropyl, 2-methylcyclopropyl, 2,2 - dimethylcyclopropyl, 2,3 - diethylcyclopropyl, 2 - butylcyclopropyl, cyclobutyl, 2-methylcyclobutyl, 3 - propylcyclobutyl, 2,3,4 - triethylcyclobutyl, cyclopentyl, 2, 2 - dimethylcyclopentyl, 3-pentylcyclopentyl, 3 - tert - butylcyclopentyl, cyclohexyl, 4 - tert - butylcyclohexyl, 3 - isopropylcyclohexyl, 2,2 - dimethylcyclohexyl, cycloheptyl, cyclooctyl, and the like. Examples of lower aryl are phenyl, 1-naphthyl, and 2-naphthyl. Examples of lower alkaryl are o-tolyl, m-tolyl, p-tolyl, m-ethylphenyl, p-tert-butylphenyl, the isomeric forms of xylyl, the isomeric forms of trimethylphenyl, 4 - methyl - 1 - naphthyl, 6 - propyl - 2 - naphthyl, 2,4,5,7-tetramethyl-1-naphthyl, and the like. Examples of lower aralkyl are benzyl, phenethyl, 1-phenylethyl, 2 - phenylpropyl, 4 - phenylbutyl, 6 - phenylhexyl, 5 - phenyl - 2 - methylpentyl, 1 - naphthylmethyl, 2 - (1 - naphthyl)ethyl, 2 - (2 - naphthylethyl), and the like. Examples of lower alkaralkyl are o-tolylmethyl, m - tolylmethyl, p - tolylmethyl, 4 - tert - butylphenylmethyl, 2 - (p - tolyl)ethyl, 1 - (m - tolyl)ethyl, 3-(o-ethylphenyl)propyl, 4 - methyl - 1 - naphthylmethyl, 6 - tert - butyl - 2 - naphthylmethyl, and the like. Examples of lower alkoxy - aralkyl are o - methoxybenzyl, m - methoxybenzyl, p - methoxybenzyl, 2 - (m - methoxyphenyl)ethyl, 3 - (p - ethoxyphenyl)propyl, 4-(p-tert - butoxyphenyl)butyl, 4 - methoxy - 1 - naphthylmethyl, and the like. Examples of lower haloaralkyl are o - chlorobenzyl, m - fluorobenzyl, p - bromobenzyl, 2 - (m - iodophenyl)ethyl, 2,4 - dichlorobenzyl, 6-bromo - 1 - naphthylmethyl, 4 - (p - chlorophenyl)butyl, and the like. Examples of heterocyclic moieties within the scope of $R_2$, in addition to those already mentioned above, are 2 - methylaziridinyl, 2 - ethylaziridinyl, 2-butylaziridinyl, 2,3 - dimethylaziridinyl, 2,2 - dimethylaziridinyl, 2 - methylazetidinyl, 3 - methylazetidinyl, 2 - octylazetidinyl, 2,2 - dimethylazetidinyl, 3,3 - diethylazetidinyl, 2,4,4 - trimethylazetidinyl, 2,3,4 - trimethylazetidinyl, 2 - methylpyrrolidinyl, 3 - butylpyrrolidinyl, 2 - isohexylpyrrolidinyl, 2,3 - dimethylpyrrolidinyl, 2,2 - dimethylpyrrolidinyl, 2,5 - diethylpyrrolidinyl, 3 - tert - butylpyrrolidinyl, 2,3,5 - trimethylpyrrolidinyl, 3,4 - dioctylpyrrolidinyl, 2 - methylpiperidino, 3 - methylpiperidino, 4 - methylpiperidino, 3 - isopropylpiperidino, 4 - tert - butylpiperidino, 2 - methyl-5 - ethylpiperidino, 3,5 - dipentylpiperidino, 2,4,6 - trimethylpiperidino, 2,6 - dimethyl - 4 - octylpiperidino, 2,3,5 - triethylpiperidino, 2 - ethylhexahydroazepinyl, 4 - tert - butylhexahydroazepinyl, 3 - heptylhexahydroazepinyl, 2, 4 - dimethylhexahydroazepinyl, 3,3 - dimethylhexahydroazepinyl, 2,4,6 - tripropylhexahydroazepinyl, 2 - methylheptamethylenimino, 5 - butylheptamethylenimino, 2,4 - diisopropylheptamethylenimino, 3,3 - diethylheptamethylenimino, 2,5,8 - trimethylheptamethylenimino, 3 - methyloctamethylenimino, 2,9 - diethyloctamethylenimino, 4 - isooctyloctamethylenimino, 2 - ethylmorpholino, 2 - methyl - 5 ethylmorpholino, 3,3 - dimethylmorpholino, 2,6 - di - tert - butylmorpholino, and the like. In each of the above examples of heterocyclic moieties, the free valence, and hence the point of attachment to a carbon atom of the triazine ring, is at the heterocyclic nitrogen atom.

The novel 1,2-dihydro-1-hydroxy-1,3,5-triazines of Formula I are amines and exist either in the nonprotonated (free base) form or the protonated (acid addition salt) form depending upon the pH of the environment. They form stable protonates (mono- or diacid addition salts) on neutralization with suitable acids, for example, hydrochloric, hydrobromic, sulfuric, phosphoric, nitric, acetric, benzoic, salicyclic, glycolic, succinic, nicotinic, tartaric, maleic, malic, pamoic, methanesulfonic, cyclohexanesulfamic, and lactic acids, and like pharmacologically acceptable acids.

The compounds of Formula I are orally and parenterally active in birds and mammals, including man, an antihypertensive agents having vasodilatory activity, and are useful for lowering blood pressure and for the treatment of shock. They are also useful as antisecretory agents and central nervous system depressants. For these purposes, they can be used in the nonprotonated (free base) form or in the protonated (acid addition salt) form in association with a pharmaceutical carrier in solid or liquid dosage forms, such as tablets, capsules, powders, pills, granules, syrups, elixirs, suppositories, sterile aqueous or vegetable oil dispersions for parenteral use, and the like, alone or in combination with other drugs.

The novel 1,2-dihydro-1-hydroxy-1,3,5-triazines also form salts with thiocyanic acid which, when condensed with formaldehyde, form resinous materials useful as pickling inhibitors according to U.S. Patents 2,425,320 and 2,606,155. They also form salts with fluosilicic acid which are useful as mothproofing agents according to U.S. Patents 1,915,334 and 2,075,359. They can also be used for making aminoplast resins by condensation with formaldehyde. The acid addition salts are also useful for upgrading the free bases.

The novel Formula I dihydrotriazines are prepared by oxidizing a triazine of the formula:

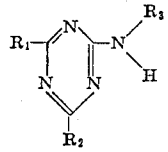

wherein $R_1$, $R_2$, and $R_3$ are as given above, with a percarboxylic acid. Particularly preferred for this purpose are the perbenzoic acids of the formula:

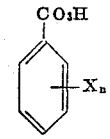

wherein X is selected from the group consisting of halogen, lower alkyl, lower alkoxy, and nitro, and wherein $n$ is from zero to 5, inclusive. However, other percarboxylic acids can be used for this oxidation. Examples of other suitable percarboxylic acids are performic acid, peracetic acid, perpropionic acid, perbutyric acid, perphthalic acid, percamphoric acid, and the like.

Triazines (guanamines) of Formula II are known in the art or can be prepared by methods known in the art [Smolin et al., "s-Triazines and Derivatives," Interscience Publishers, Inc., New York, N.Y., pp. 222–33 (1959)]. For example, they can be prepared by reacting a biguanide of the formula:

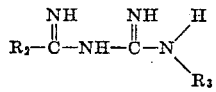

wherein $R_2$ and $R_3$ are as given above, with a carboxylic acid ester, a carboxylic acid halide, a carboxylic acid anhydride, or a nitrile [e.g., Shapiro et al., J. Am. Chem. Soc. 79, 5064–71 (1957); Shapiro et al., J. Am. Chem. Soc. 81, 3996–4000 (1959); Overberger et al., J. Am. Chem. Soc. 76, 1061–5 (1954); Shapiro et al., J. Org. Chem. 26, 68–74, 3331–4 (1961); Cockburn, Can. J. Chem. 35, 1285–92 (1957); Bamberger et al., Ber. Deut. Chem. 25, 525–33 (1892); Thurston, U.S. Patent 2,427,-314; Schaefer, U.S. Patent 2,777,848]. Illustratively, 2-anilino-4-dimethylamino-6-methyl-1,3,5-triazine is prepared by reacting 1,1-dimethyl-5-phenylbiguanide (Formula IV; $R_2$=dimethylamino; $R_3$=phenyl) with acetyl chloride in the presence of sodium hydroxide [e.g., Shapiro et al., J. Org. Chem. 26, 68–74 (1961)]. Further, 2-amino-4-methyl-6-piperidino-1,3,5-triazine is prepared by reacting 1,1-pentamethylenebiguanide (Formula IV; $R_2$=piperidino; $R_3$=hydrogen) first with acetic anhydride and then with sodium hydroxide [e.g., Cockburn et al., Can. J. Chem. 35, 1285–92 (1957)].

Other examples of Formula IV biguanides suitable for preparing triazines within the scope of Formula II are 1,1-dimethylbiguanide, 1,1-diethylbiguanide, 1,1-dipropylbiguanide, 1,1-dibutylbiguanide, 1,1-di-tert-butylbiguanide, 1,1-diallylbiguanide, 1-allyl-1-methylbiguanide, 1-ethyl-1-(2-methylallyl)-biguanide, 1,1-di-4-hexenylbiguanide, 1,1-ethylenebiguanide, 1,1-trimethylenebiguanide, 1,1-tetramethylenebiguanide, 1,1-(1,1-dimethyltetramethylene)biguanide, 1,1-(2,3-dioctyltetramethylene)biguanide, 1,1-(4-ethyl-1-methylpentamethylene)-biguanide, 1,1-(1,3,5-trimethylphentamethylene)biguanide, 1,1-hexamethylenebiguanide, 1,1-octamethylenebiguanide, 1,1-(3-oxapentamethylene)biguanide, 1,1,5-trimethylbiguanide, 5-butyl-1,1-diethylbiguanide, 1,1,5-triallylbiguanide, 1-allyl-5-cyclobutyl-1-ethylbiguanide, 5-cyclohexyl-1,1-pentamethylenebiguanide, 5-(2,6-dimethylphenyl)-1,1-(3-oxapentamethylene)-biguanide, 1,1-diallyl-5-phenethylbiguanide, and the like. Other examples of acid halides and anhydrides, and examples of esters and nitriles, which can be reacted with biguanides within the scope of Formula IV to prepare triazines within the scope of Formula II are ethyl formate, ethyl acetate, ethyl propionate butyryl chloride, methyl octanoate, ethyl acrylate, acryloyl chloride, 4-hexenoyl chloride, methyl 4-methyl-2-octenoate, ethyl 3-ethoxypropionate, isopropoxyacetonitrile, 2-propoxypropionitrile, 3-methoxypropionyl chloride, methyl cyclopropanecarboxylate, cyclohexanecarbonyl chloride, ethyl 4-tert-butylcyclohexanecarboxylate, methyl benzoate, p-toluoyl chloride, ethyl 2,6-dimethylbenzoate, ethyl 1-naphthoate, ethyl phenylacetate, p-chlorobenzoyl chloride, methyl p-bromobenzoate, methyl p-methoxyphenylacetate, ethyl o-ethylphenylacetate, propionic anhydride, butyric anhydride, and the like.

Biguanides of Formula IV suitable for preparing Formula II triazines, for example, each of the specific biguanides mentioned above, are either known in the art or can be prepared by methods known in the art [e.g., Shapiro et al., J. Am. Chem. Soc. 81, 3725—36, 3996–4000, 4635–9 (1959); Shapiro et al., J. Org. Chem. 26, 68–74 (1961); Detweiler et al., J. Am. Chem. Soc. 74, 1483–5 (1952); Oxley et al., J. Chem. Soc. 1252–6 (1951); Cockburn et al., Can. J. Chem. 35, 1285–92 (1957)]. For example, biguanides of Formula IV wherein $R_3$ is hydrogen can be prepared by reacting cyanoguanidine (dicyandiamide) with a secondary amine salt, for example, the hydrochloride, according to the equation:

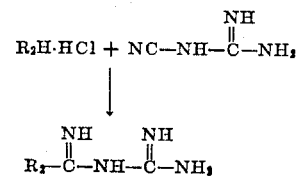

wherein $R_2$ is a given above. Illustratively, 1,1-pentamethylenebiguanide hydrochloride is prepared by heating a mixture of piperidine hydrochloride and cyanoguanidine [e.g., Shapiro et al., J. Am. Chem. Soc. 81, 3725–36

(1959)]. Biguanides of Formula IV wherein $R_3$ is given above and not hydrogen can be prepared by reacting a secondary amine salt, e.g., the hydrochloride, with a 3-monosubstituted 1-cyanoguanidine, or by reacting a primary amine salt, e.g., the hydrochloride, with a 3,3-disubstituted 1-cyanoguanidine, according to the equations:

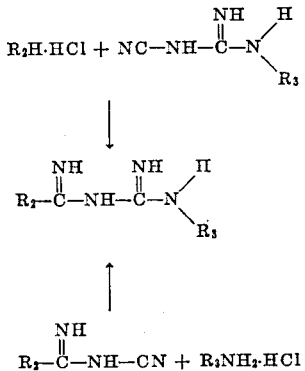

Illustratively, 1,1-dimethyl-5-propylbiguanide hydrochloride (Formula IV; $R_2$=dimethylamino; $R_3$=propyl) is prepared either by heating a mixture of dimethylamine hydrochloride and 1-cyano-3-propylguanidine or by heating a mixture of propylamine hydrochloride and 1-cyano-3,3-dimethylguanidine [e.g., Shapiro et al., J. Am. Chem. Soc. 81, 4635–9 (1959)]. 3-monosubstituted 1-cyanoguanidines and 3,3-disubstituted 1-cyanoguanidines suitable for preparing Formula IV biguanides as above described are known in the art or can be prepared by methods known in the art, for example, by reacting a primary or a secondary amine with an alkali metal salt of dicyanimide [e.g., Shapiro et al., J. Am. Chem. Soc., 81, 4635–9 (1959); Redmon et al., U.S. Patent 2,455,807].

Another method for preparing triazines within the scope of Formula II starts with the reaction of cyanuric chloride with one molecular equivalent of a Grignard reagent of the Formula $R_1MgX$, wherein $R_1$ is a given above (except hydrogen), thereby producing a triazine of the formula:

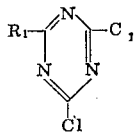

V

[Hirt et al., Helv. Chim. Acta 33, 1365–9 (1950); Overberger et al., J. Am. Chem. Soc., 79, 941–8 (1957)]. Then, one of the chlorines in the Formula V triazine is replaced with a primary amino group, i.e., —$NH_2$, or a secondary amino group, i.e., —$NHR_3$, and the other chlorine is replaced with a tertiary amino group, i.e., —$R_2$, wherein $R_2$ and $R_3$ are as defined above. These two replacements are accomplished by successive separate reactions of the Formula V triazine with one molecular equivalent of ammonia or a primary amine and with one molecular equivalent of a secondary amine, in either order. These reactions are carried out by procedures known in the art to be useful for replacing the chlorines of chlorotriazines with primary, secondary, or tertiary amino groups [e.g., Hirt et al., Helv. Chim. Acta 33, 1365–9 (1950); Overberger et al., J. Am. Chem. Soc. 79, 941–8 (1957); Thurston et al., J. Am. Chem. Soc., 73, 2981–3 (1951); Kaiser et al., J. Am. Chem. Soc., 73, 2984–6 (1951); Schaefer et al., J. Am. Soc., 77, 5918–2 (1955); Campbell et al., J. Org. Chem., 26, 2786–9 (1961); Kaiser et al., U.S. Patent 2,653,934]. Illustratively, 2,4-dichloro-6-methyl-1,3,5-triazine is prepared by reacting cyanuric chloride with methylmagnesium bromide, and is transformed first to 2 - benzylamino-4-chloro-6-methyl-1,3,5-triazine by reaction with benzylamine, and then to 2 - benzylamino-4-diallylamino-6-methyl-1,3,5-triazine by reaction with diallylamine. Alternatively, the 2,4-dichloro-6-methyl-1,3,5-triazine is reacted first with diallylamine to produce 2-chloro-4-diallylamino-6-methyl-1,3,5-triazine and then with benzylamine to produce the same 2-benzylamino-4-diallylamino-6-methyl - 1,3,5 - triazine (Formula II; $R_1$=methyl; $R_2$=diallylamino; $R_3$=benzyl). Examples of suitable primary amines for this purpose are methylamine, ethylamine, propylamine, isopropylamine, butylamine, secbutylamine, pentylamine, isopentylamine, hexylamine, heptylamine, octylamine, allylamine, 2-methylallylamine, 2-butenylamine, 3-butenylamine, 3-pentenylamine, 4-hexenylamine, 4,4-dimethyl-2-pentenylamine, cyclobutylamine, cyclohexylamine, 4-tert-butylcyclohexylamine, aniline, 1-naphthylamine, 2-naphthylamine, benzylamine, phenethylamine, and the like. Examples of suitable secondary amines for this purpose are dimethylamine, diethylamine, N-methylethylamine, dipropylamine, N - ethylisopropylamine, di - secbutylamine, N-methylbutylamine, dipentylamine, N-ethyl-2,4-dimethylpentylamine, N-methyloctylamine, diheptylamine, diallylamine, N-methylallylamine, di-1-methylallylamine, di-2-methylallylamine, N-ethyl-1-methylallylamine, N-propyl-2-ethylallylamine, di-2-pentenylamine, di-3-butenylamine, di-4-hexenylamine, N-butyl-2-butenylamine, di(4-methyl-3-hexenyl)amine, aziridine, 2-methylaziridine, 2,2-dimethylaziridine, azetidine, 2-ethylazetidine, 3-octylazetidine, 3,3-dimethylazetidine, 2,2,4-trimethylazetidine, pyrrolidine, 2-propylpyrrolidine, 3-butylpyrrolidine, 2 - isohexylpyrrolidine, 2,3 - dimethylpyrrolidine, 2,2,4 - trimethylpyrrolidine, 2,5 - diethylpyrrolidine, 3,4-dioctylpyrrolidine, piperidine, 2-methylpiperidine, 3-ethylpiperidine, 4-butylpiperidine, 2,4,6-trimethylpiperidine, 2-methyl-5-ethylpiperidine, 3,5-dipentylpiperidine, hexahydroazepine, 2-ethylhexahydroazepine, 4-tertbutylhexahydroazepine, 3,3-dimethylhexahydroazepine, 2,4,6-tripropylhexahydroazepine, heptamethylenimine, 2-methylheptamethylenimine, 2,4 - diisopropylheptamethylenimine, octamethylenimine, 4-isooctyloctamethylenimine, morpholine, 2-ethylmorpholine, 2-methyl-5-ethylmorpholine, 2,6-dimethylmorpholine, and the like. Examples of suitable Grignard reagents for this purpose are methylmagnesium chloride, methylmagnesium bromide, ethylmagnesium chloride, propylmagnesium bromide, butylmagnesium chloride, isobutylmagnesium bromide, hexylmagnesium chloride, 3-pentenylmagnesium bromide, 4-hexenylmagnesium chloride, cyclopentylmagnesium bromide, cycloheylmagnesium chloride, 4-tertbutylcyclohexylmagnesium bromide, phenylmagnesium bromide, p-tolylmagnesium iodide, benzylmagnesium bromide, p-ethylbenzylmagnesium bromide, o - methoxybenzylmagnesium bromide, p-chlorobenzylmagnesium bromide, and the like.

Triazines within the scope of Formula II can also be prepared by reacting a triazine of the formula:

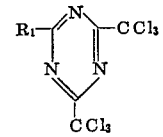

VI wherein $R_1$ is as given above, first with ammonia or an appropriate primary amine, and then with an appropriate secondary amine [Kreutzberger, J. Am. Chem. Soc., 79, 2629–33 (1957); Shcroeder et al., J. Am. Chem. Soc., 78, 2447–51 (1956)]. If desired, the replacement reactions can be carried out first with the secondary amine, and then with ammonia or the primary amine. Primary and secondary amines suitable for this purpose are those listed above as being suitable for replacing the chlorines of dichlorotriazines (Formula V).

Percarboxylic acids suitable for the oxidation of Formula II triazines to Forumla I 1, 2-dihydro-1-hydroxy-1,3,5-triazines are known in the art or can be prepared by methods known in the art. With regard to the preferred Formula III perbenzoic acids, see especially Braun, Organic Syntheses, Coll. vol. I, 2d ed., 431

(1941) and Silbert et al., J. Org. Chem. 27, 1336–42 (1962). In Formula III, when *n* is 2 or more, the X's can be the same or different. Examples of halogen are fluorine, chlorine, bromine, and iodine. Examples of lower alkyl are methyl, ethyl, propyl, butyl, pentyl, hexyl, heptyl, octyl, and isomeric forms thereof. Examples of lower alkoxy are methoxy, ethoxy, propoxy, butoxy, pentyloxy, hexyloxy, heptyloxy, octyloxy, and isomeric forms thereof. Illustrative oxidizing acids of Formula III include perbenzoic acid, o-, m-, and p-chloro- and bromoperbenzoic acids, 3,5-dichloroperbenzoic acid, 2,3,5,6-tetrachloroperbenzoic acid, 4-methylperbenzoic acid, 3,4-dimethylperbenzoic acid, pentamethylperbenzoic acid, o-, m-, and p-methoxyperbenzoic acids, 3-nitroperbenzoic acid, 2,4-dinitroperbenzoic acid, 3-chloro-4-methoxyperbenzoic acid, 3-chloro-4-nitroperbenzoic acid, and the like.

In carrying out the reaction between the Formula II triazine and the Formula III perbenzoic acid, the two reactants are mixed advantageously below about 50° C., preferably between about −10° and +10° C., although higher or lower temperatures can be used. It is preferred to mix the reactants in the presence of an inert solvent and to stir the mixture until the reaction is substantially complete. Suitable solvents include N-loweralkylpyrrolidones, e.g., N-methylpyrrolidone; lower alkanols, e.g., methanol, ethanol, propanol, isopropyl alcohol, the butanols and the pentanols; lower alkanol and glycol esters of lower alkanoic acids, e.g., ethyl acetate, butyl acetate, pentyl acetate, ethylene glycol monoacetate, diethylene glycol monoacetate; ethers, e.g., diethyl ether, diisopropyl ether, ethylene glycol monoethyl ether, diethylene glycol monobutyl ether; and the like. The molecular ratio of Formula II triazine and Formula III perbenzoic acid can be varied widely. Ratios from about 1:1 to 1:5, preferably from about 1:1.5 to 1:2.5, are suitable.

Many Formula II triazines with carbon-carbon double bond unsaturation in any or all of $R_1$, $R_2$, and $R_3$ can be oxidized to corresponding Formula I 1,2-dihydro-1-hydroxyl-1,3,5-triazines without double bond epoxidation, particularly when the double bonds are part of lower 2-alkenyl groupings. If the double bonds are not resistant to epoxidation, they can be protected before and regenerated after the oxidation. For example, a double bond can be brominated, the compound oxidized, and the double bond regenerated by treatment with zinc metal in a solvent such as ethanol. Alternatively, epoxidation can be allowed to occur and the epoxy group transformed back to a double bond. An example is the procedure of Cornforth et al., J. Chem. Soc., 112–27 (1959), involving treatment of an epoxide with a mixture of sodium iodide, sodium acetate, zinc, and acetic acid. Other methods of producing Formula I compounds with carbon-carbon double bonds in an $R_1$, $R_2$, or $R_3$ grouping involve starting with Formula II triazines, one $R_1$, $R_2$, or $R_3$ carbon atom of which is attached to a halogen, e.g., bromine or iodine, another carbon atom vicinal to that carbon atom being attached to a lower alkoxy, e.g., methoxy, or to a carboxyl. After the oxidation, the halogen plus lower alkoxy are removed by zinc treatment [Dykstra et al., J. Am. Chem. Soc. 52, 3396–3404 (1930)], or the halogen plus carboxyl are removed by sodium carbonate treatment [Young et al., J. Am. Chem. Soc. 51, 2528–34 (1929)]. Other methods of protecting, regenerating, or introducing carbon-carbon double bonds to produce desired unsaturated Formula I 1,2-dihydro-1-hydroxy-1,3,5-triazines will be apparent to those skilled in the art.

The 1,2-dihydro-1-hydroxy-1,3,5-triazine of Formula I can be isolated from the oxidation reaction mixture by conventional techniques, for example, by successive evaporation of the reaction solvent at reduced pressure, solution of the basic Formula I product in aqueous acid, e.g., hydrochloric acid, removal of undesired water-insoluble reaction products by filtration, neutralization of the acidic filtrate, and isolation of the Formula I product by filtration, extraction, or chromatography. The isolated material can be purified by conventional techniques, for example, by recrystallization from a suitable solvent or pair of solvents, or by preparation of an acid addition salt, e.g., the hydrochloride or acid phosphate, and recrystallization of the salt, followed, if desired, by reconversion of the salt to the free base in the usual manner.

1,2-dihydro-1-hydroxy-1,3,5-triazines within the scope of Formula I and containing one or more lower alkenyls can be transformed by hydrogenation to other Formula I products containing lower alkyls in place of the lower alkenyls. In this process, each lower alkenyl is hydrogenated to the corresponding lower alkyl. The Formula I reactant is not otherwise altered by the hydrogenation. For example, a Formula I compound wherein $R_1$ is vinyl, or wherein $R_2$ is diallylamino, or wherein $R_3$ is allyl is transformed to the corresponding formula I compound wherein $R_1$ is ethyl, or wherein $R_2$ is dipropylamino, or wherein $R_3$ is propyl. More precisely, a 1,2-dihydro-1-hydroxy-1,3,5-triazine product of the formula:

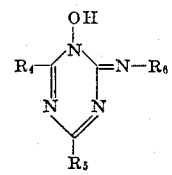

VI wherein $R_4$ is selected from the group consisting of hydrogen, lower alkyl, lower alkoxyalkyl, lower cycloalkyl, lower aryl, lower alkaryl, lower aralkyl, lower alkaralkyl, lower alkoxyaralkyl, and lower haloaralkyl; wherein $R_5$ is selected from the group consisting of di-lower-alkylamino and the heterocyclic moieties, aziridinyl, azetidinyl, pyrrolidinyl, piperidino, hexahydroazepinyl, heptamethylenimino, octamethylenimino, and morpholino, each of said heterocyclic moieties having attached as substituents on carbon atoms thereof zero to 3 lower alkyls inclusive, the nitrogen atom of $R_5$ being the point of attachment of $R_5$ to the ring in said formula; and wherein $R_6$ is selected from the group consisting of hydrogen, lower alkyl, lower cycloalkyl, lower aryl, and lower aralkyl, with the proviso that at least one lower alkyl be present in said 1,2-dihydro-1-hydroxy-1,3,5-triazine product in addition to the lower alkyls which can be attached to a heterocyclic moiety, can be prepared by hydrogenating a Formula I, 1,3-dihydro-1-hydroxy-1,3,5-triazine reactant, wherein $R_1$, $R_2$, and $R_3$ are as defined above, with the proviso that at least one lower alkenyl group be present in said reactant.

This hydrogenation is preferably carried out in the presence of a hydrogenation catalyst, for example, a noble metal, e.g., platinum, palladium, rhodium, or a base metal, e.g., Raney nickel, Raney cobalt, and in the presence of an inert solvent, for example, methanol, ethanol, dioxane, ethyl acetate, and the like. Hydrogenation pressures ranging from about atmospheric to about 50 p.s.i., and hydrogenation temperatures ranging from about 10° to about 100° C. are preferred. The 1,2-dihydro-1-hydroxy-1,3,5-triazine product can be isolated by conventional techniques, for example, by filtration of the catalyst and evaporation of the solvent, and can be purified as described above.

The 1,2-dihydro-1-hydroxy-1,3,5-triazines of Formula I are transformed to monoacid and diacid addition salts by neutralization with appropriate amounts of the corresponding inorganic or organic acid, examples of which are given above. These transformations can be carried out by a variety of procedures known to the art to be generally useful for the preparation of amine acid addition salts. The choice of the most suitable procedure will depend on a variety of factors including convenience of operation, economic considerations, and particularly the solubility characteristics of the Formula I amine, the acid, and the acid addition salt. If the acid is soluble in water, the basic compound of Formula I can be dissolved in water containing either one or two equivalent amounts of the acid, and thereafter, the water can be removed by evaporation. If the acid is soluble in a relatively non-polar solvent, for example, diethyl ether or diisopropyl ether, separate solutions of the acid and the basic Formula I compound in such a solvent can be mixed in equivalent amounts, whereupon the acid addition salt will usually precipitate because of its relatively low solubility in the non-polar solvent. Alternatively, the basic Formula I compound can be mixed with the acid in the presence of a solvent of moderate polarity, for example, a lower alkanol, a lower alkanone, or a lower alkyl ester of a lower alkanoic acid. Examples of these solvents are ethanol, acetone, and ethyl acetate, respectively. Subsequent admixture of the resulting solution of acid addition salt with a solvent of relatively low polarity, for example, diethyl ether or hexane, will usually cause precipitation of the acid addition salt.

The 1,2-dihydro-1-hydroxy-2-imino-1,3,5-triazines of Formula I, wherein $R_3$ is hydrogen, also form carboxyacylates on treatment with carboxyacylating agents, for example, carboxylic acid anhydrides and carboxylic acid chlorides. These carboxyacylates are amines, and exist in either the nonprotonated (free base) form or the protonated (acid addition salt) form depending upon the pH of the environment. They form stable protonates on neutralization with suitable acids, for example, those listed above as suitable for the formation of acid addition salts of the Formula I dihydrotriazines.

These carboxyacylates and their acid addition salts are active in birds and mammals, including man, as antihypertensive agents having vasodilating activity, and are useful for lowering blood pressure and for the treatment of shock. The carboxyacylates can also be used for upgrading a Formula I dihydrotriazine free base by transformation of the latter to a carboxyacylate, purification of the carboxyacylate, and then removal of the carboxyacyl moiety or moieties, advantageously by alcoholysis. The carboxyacylate acid addition salts can also be used for upgrading the carboxyacylate free bases.

Although substantially any carboxyacylating agent can be used to produce these carboxyacylates, especially suitable are the anhydrides, mixed anhydrides, and acid chlorides of alkanoic, cycloalkanoic, alkenoic, cycloalkenoic, aralkanoic, aromatic, and heterocyclic carboxylic acids. These anhydrides and acid chlorides can also be substituted with any of a wide variety of atomic or molecular moieties unreactive with the dihydrotriazine reactants. Examples of such substituents are alkyl, e.g., methyl, butyl, decyl; alkoxy, e.g., methoxy, ethoxy, pentyloxy; alkylthio, e.g., methylthio, propylthio, heptylthio; dialkylamino, e.g., dimethylamino, diethylamino, dihexylamino; alkoxycarbonyl, e.g., methoxycarbonyl, propoxycarbonyl, nonoxycarbonyl; carboxyacyl, e.g., acetyl, butyryl; carboxamido, e.g., benzamido, acetamido; nitro; fluoro; cyano; and the like. Chlorine, bromine, and iodine can also be substituents on aromatic portions of the carboxyacylating agents.

Examples of suitable anhydrides are acetic anhydride, propionic anhydride, butyric anhydride, isobutyric anhydride, acrylic anhydride, crotonic anhydride, cyclohexanecarboxylic anhydride, benzoic anhydride, naphthoic anhydride, furoic anhydride, and the like, as well as the corresponding anhydrides substituted with one or more of the above-mentioned substituents. Examples of suitable acid chlorides are acetyl chloride, propionyl chloride, butyryl chloride, isobutyryl chloride, decanoyl chloride, acryloyl chloride, crotonoyl chloride, cyclohexanecarbonyl chloride, 3-cyclohexenecarbonyl chloride, phenylacetyl chloride, succinyl chloride, benzoyl chloride, naphthoyl chloride, furoyl chloride, 3-pyridinecarbonyl chloride, phthaloyl chloride, and the like, as well as the corresponding acid chlorides substituted with one or more of the above-mentioned substituents.

The carboxyacylate is produced by mixing the 1,2-dihydro-1-hydroxy-2-imino-1,3,5-triazine (Formula I, $R_3=H$) with an appropriate amount of the anhydride or acid chloride, preferably in the presence of a diluent. The carboxyacylation usually takes place rapidly in the range about $-20°$ to about $+50°$ C. Suitable diluents are ethers, e.g., diethyl ether and tetrahydrofuran; ketones, e.g., acetone and methyl ethyl ketone; esters, e.g., methyl acetate and ethyl acetate; acetonitrile, pyridine, and the like.

The carboxyacylate obtained depends on such factors as the nature of the dihydrotriazine reactant, the nature and amount of carboxyacylating agent, the reaction time, and the reaction temperature. An N-monocylate, an O,N-diacylate, or a mixture of those is usually obtained. Relatively low reaction temperatures, i.e., about $-20°$ to about $20°$ C., and relatively short reaction times, i.e., a few seconds to about 10 minutes, usually favor production of the N-monoacylate. Higher temperatures, i.e., about $30°$ to about $50°$ C., and longer reaction times, i.e., about 30 minutes to several hours, usually favor production of the O,N-diacylate.

At least one molecular equivalent of carboxyacylating agent should be used for the introduction of each carboxyacyl moiety into a Formula I dihydrotriazine ($R_3=H$). A substantial excess of craboxyacylating agent, i.e., about 4 to about 25 molecular equivalents, should usually be used for production of an O,N-diacylate.

The desired carboxyacylate usually separates from the reaction mixture in crystalline form as an acid addition salt. The hydrochloric acid addition salt is obtained when a carboxylic acid chloride is used as a carboxyacylating agent. When a carboxylic acid anhydride is used as a carboxyacylating agent, the corresponding organic carboxylic acid addition salt is obtained. These salts can be separated from the reaction mixture in the usual manner, for example, by filtration or centrifugation. Alternatively, the diluent can be evaporated, preferably at reduced pressure. The resulting acid addition salt can then be purified if desired by conventional techniques, for example, by recrystallization from a suitable solvent or mixture of solvents.

The free base form of the carboxyacylate can be obtained by neutralization of the acid addition salt by another base of similar or slightly greater strength, e.g., ammonia or an alkyl-, dialkyl-, or trialkylamine. Especially useful for that purpose is triethylamine. Advantageously, the acid addition salt is dissolved in a solvent of moderate polarity, e.g., ethanol, and sufficient triethylamine is added to neutralize the acid. Excess triethylamine should be avoided. The resulting free base can be isolated and purified by conventional methods, for example, evaporation of the solvent and recrystallization from a suitable solvent or mixture of solvents. The free base can then, if desired, be transformed to a different acid addition salt by neutralization with an organic or inorganic acid.

Carboxyacylates obtained from Formula I dihydrotriazines can be represented by the formula:

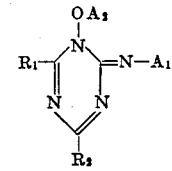

VIII wherein $R_1$ is selected from the group consisting of hydrogen, lower alkyl, lower alkenyl, lower alkoxyalkyl, lower cycloalkyl, lower aryl, lower alkaryl, lower aralkyl, lower alkaralkyl, lower alkoxyaralkyl, and lower haloaralkyl; wherein $R_2$ is selected from the group consisting of di-lower-alkylamino, di-lower-alkenylamino, N-lower-alkyl-lower-alkenylamino, and the heterocyclic moieties, aziridinyl, azetidinyl, pyrrolidinyl, piperidino, hexahydroazepinyl, heptamethylenimino, octamethylenimino, and morpholino, each of said heterocyclic moieties having attached as substituents on carbon atoms thereof zero to 3 lower alkyls, inclusive, the nitrogen atom of $R_2$ being the point of attachment of $R_2$ to the ring in said formula; wherein $A_1$ is carboxyacyl, and wherein $A_2$ is selected from the group consisting of hydrogen and carboxyacyl.

The dihydrotriazine carboxyacylates of Formula VIII can be represented by other formulas. For example, when $A_2$ is hydrogen, the carboxyacylates can be represented by Formula VIII A:

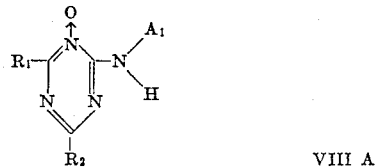

VIII A

Compounds of Formula VIII A are tautomeric with Formula VIII compounds wherein $A_2$ is hydrogen. These carboxyacylates are likely to be mixtures of tautomeric forms, the compositions of which are dependent on such factors as the nature of the substituents and the carboxyacyl moiety, and the environment. In some instances, one form or another may predominate. Formula VIII is used for convenience, and the other forms are not excluded.

Dihydrotriazine carboxyacylates prepared as described above are easily transformed back to the Formula I dihydrotriazine, preferably by warming with a lower alkanol, e.g., methanol or ethanol. Simultaneous treatment with a base, for example, gaseous ammonia, usually accelerates the alcoholysis.

The invention can be more fully understood by the following examples.

EXAMPLE 1

*Part A.—2-amino-4-diallylamino-1,3,5-triazine*

Sodium metal (4.6 g.; 0.20 gram atom) was reacted with 100 ml. of methanol, and the mixture was added to a stirred solution of 1,1-diallylbiguanide hydrochloride (21.8 g.; 0.10 mole) in 50 ml. of methanol at about 25° C. Ethyl formate (7.4 g.; 0.10 mole) was then added to the resulting stirred mixture during 5 minutes at 25° C. After stirring for an additional 48 hours at 25° C., the solvent was removed under reduced pressure and about 50 ml. of water was added to the residue. The colorless needles which formed were filtered and recrystallized from a mixture of ethanol and water to give 11.6 g. of 2-amino-4-diallylamino-1,3,5-triazine; M.P. 113–116° C.

*Analysis.*—Calcd. for $C_9H_{13}N_5$: C, 56.52 H, 6.85; N, 36.63. Found: C, 56.69; H, 6.98; N, 37.16. I.R.—(Principal bands; mineral oil mull) 3380, 3330, 3160, 1660, 1645, 1585, 1550, 1515, 1240, 1190, 815 cm.$^{-1}$.

*Part B.—1,2-dihydro-1-hydroxy-4-diallylamino-2-imino-1,3,5-triazine*

A solution of perbenzoic acid (6.9 g.; 0.05 mole) in 50 ml. of ethanol was added gradually during 20 minutes to a stirred suspension of 2-amino-4-diallylamino-1,3,5-triazine (5.1 g.; 0.027 mole) in 150 ml. of ethanol at 5° C. The resulting mixture was stirred for 18 hours at 0–5° C. Solvent was evaporated under reduced pressure, and a solution of 10 ml. of concentrated hydrochloric acid in 15 ml. of water was added to the residue. The resulting suspension was filtered, the filter cake being washed twice with 50-ml. portions of water. The combined filtrate and washings were adjust to pH 9 with aqueous 50% sodium hydroxide solution. The solid which separated was filtered and washed with 50 ml. of water. The filtrate and washings were combined and extracted with twelve 250-ml. portions of chloroform. The chloroform extracts were combined and dried with sodium sulfate. Evaporation of the chloroform gave a solid residue which was recrystallized from acetonitrile to give 2.3 g. of 1,2-dihydro-1-hydroxy-4-diallylamino-2-imino-1,3,5-triazine; M.P. 139–141° C.

*Analysis.*—Calcd. for $C_9H_{13}N_5O$: C, 52.16; H, 6.32. Found: C, 52.34; H, 5.98 U.V.—($H_2O$) 255 m$\mu$ ($\epsilon$=15,850); 315 m$\mu$ ($\epsilon$=5,850). (0.01 N HCl) 229 m$\mu$ ($\epsilon$=20,200); 245 m$\mu$ (sh) ($\epsilon$=14,450); 280 m$\mu$ (sh) ($\epsilon$=2,950). (0.01 N KOH) 255 m$\mu$ ($\epsilon$=15,250); 315 m$\mu$ ($\epsilon$=5,800). I.R.—(Principal bands; mineral oil mull) 3380, 1665, 1606, 1510, 1480, 1255, 1165, 1115, 1102 cm.$^{-1}$.

Addition of absolute ethanol containing one equivalent of hydrogen chloride to an absolute ethanol solution of 1,2-dihydro-1-hydroxy-4-diallylamino-2-imino-1,3,5-triazine followed by addition of about 4 volumes of diethyl ether gives the triazine monohydrochloride. Use of 2 equivalents of hydrogen chloride in this procedure gives the dihydrochloride. Similar use of one equivalent of benzoic acid gives the monobenzoic acid addition salt.

EXAMPLE 2

*Part A.—2-amino-4-diallylamino-6-methyl-1,3,5-triazine*

Sodium metal (3.45 g.; 0.15 gram atom) was reacted with 50 ml. of methanol, and the mixture was added to a stirred solution of 1,1-diallylbiguanide hydrochloride (16.6 g.; 0.076 mole) in 100 ml. of methanol at about 25° C. Ethyl acetate (7.0 g.; 0.08 mole) was then added to the resulting stirred mixture. After stirring for an additional 40 hours at 25° C., 300 ml. of water was added. The solid which precipitated on cooling was filtered and dried to give a solid (9.0 g.; M.P. 68–70° C.) which, on recrystallization from a mixture of methanol and water, gave 8.5 g. of 2-amino-4-diallylamino-6-methyl-1,3,5-triazine in the form of colorless needles; M.P. 81–82° C.

*Analysis.*—Calcd. for $C_{10}H_{15}N_5$: C, 58.51; H, 7.37; N, 34.12. Found: C, 58.98; H, 7.24; N, 33.74 I.R.—(Principal bands; mineral oil mull) 3310, 3120, 1530, 1240, 1040, 815 cm.$^{-1}$.

*Part B.—1,2-dihydro-1-hydroxy-4-diallylamino-2-imino-6-methyl-1,3,5-triazine*

Following the procedure of Example 1, Part B, 2-amino-4-diallylamino-6-methyl-1,3,5-triazine (5.1 g.; 0.025 mole) was oxidized with perbenzoic acid (6.9 g.; 0.05 mole) in 50 ml. of ethanol. Recrystallization of the product from acetonitrile gave 3.65 g. of 1,2-trihydro-1-hydroxy-4-diallylamino-2-imino-6-methyl-1,3,5-triazine; M.P. 132–134° C. Two additional recrystallizations from acetonitrile gave 3.0 g. of the same product with the same melting point.

*Analysis.*—Calcd. for $C_{10}H_{15}N_5O$: C, 54.28; H, 6.83; N, 31.66. Found: C, 54.12; H, 6.64; N, 31.05 U.V.—($H_2O$) 255 m$\mu$ ($\epsilon$=16,950); 305 m$\mu$ ($\epsilon$=5,900). (0.01 NHCl) 226 m$\mu$ ($\epsilon$=17,350); 239 m$\mu$ ($\epsilon$=16,950); 270 m$\mu$ (sh) ($\epsilon$=6,450). (0.01 N KOH) 255 m$\mu$ ($\epsilon$=17,200); 305 m$\mu$ ($\epsilon$=4,750). I.R.—(Principal bands; mineral oil mull) 3395, 1658, 1642, 1595, 1545, 1520, 1486, 1260, 1178, 1140, 1070, 1005 cm.$^{-1}$.

EXAMPLE 3

*1,2-dihydro-1-hydroxy-4-dipropylamino-2-imino-6-methyl-1,3,5-triazine*

A mixture of 1,2-dihydro-1-hydroxy-4-diallylamino-2-imino-6-methyl-1,3,5-triazine (1.00 g.; 0.0045 mole), 25 ml. of ethanol, and 10 mg. of platinum oxide was shaken with hydrogen at 50 lbs. initial pressure for 10 minutes at 25° C. The decrease in hydrogen pressure indicated uptake of 0.009 mole of hydrogen. After removal of catalyst by filtration, solvent was removed under reduced pressure and the residue was recrystallized twice from acetonitrile to give 0.65 g. of 1,2-dihydro-1-hydroxy-4-dipropylamino-2-imino-6-methyl-1,3,5-triazine; M.P. 145–147° C.

*Analysis.*—Calcd. for $C_{10}H_{19}N_5O$: C, 53.31; H, 8.50. Found: C, 53.81; H, 8.04. U.V.—($H_2O$) 211.5 m$\mu$ ($\epsilon$=20,800); 255 m$\mu$ ($\epsilon$=16,650); 305 m$\mu$ ($\epsilon$=5,100). (0.01 N $H_2SO_4$) 227 m$\mu$ ($\epsilon$=16,850); 241 m$\mu$ ($\epsilon$=15,600); 280 m$\mu$ (sh.) ($\epsilon$=4,350). (0.01 N KOH) 255 m$\mu$ ($\epsilon$=16,550); 304 m$\mu$ ($\epsilon$=5,100). I.R.—(Principal band; mineral oil mull) 3300, 1690, 1660, 1590, 1525, 1175, 1105, 1080, 1035, 1015, 775 cm.$^{-1}$. N.M.R.—The nuclear magnetic resonance spectrum of this compound was observed in deuterochloroform on a Varian A-60 spectrophotometer. The following absorption frequencies measured in cycles per second were observed downfield from tetramethylsilane which was arbitrarily set at 0 c.p.s. Typical dipropylamine absorption was found at 53 c.p.s. (triplet, 6 protons), 95 c.p.s. (quintuplet, 4 protons) and 207 c.p.s., triplet, 4 protons). A band at 154 c.p.s. (singlet, 3 protons) was found for the $CH_3$ group on the triazine ring and absorption at 460 c.p.s. (broad singlet, 2 protons) is due to the two hydrogens on nitrogen and oxygen.

EXAMPLE 4

*Part A.—2-amino-4-diallylamino-6-ethyl-1,3,5-triazine*

Sodium metal (18.4 g.; 0.80 gram atom) was reacted with 300 ml. of methanol, and the mixture was added to a stirred solution of 1,1-diallylbiguanide hydrochloride (87.0 g.; 0.40 mole) in 300 ml. of methanol at about 25° C. Ethyl propionate (44.9 g.; 0.44 mole) was then added to the resulting stirred mixture at 25° C. After stirring for 71 hours at 25° C., the reaction mixture was diluted with 2000 ml. of water and cooled. The solid which precipitated was filtered and recrystallized from a mixture of methanol and water to give 57.1 g. of 2-amino-4-diallylamino-6-ethyl-1,3,5-triazine in the form of white crystals; M.P. 65–66° C.

*Analysis.*—Calcd. for $C_{11}H_{17}N_5$: C, 60.25; H, 7.81. Found: C, 60.40; H, 7.34. U.V.—($C_2H_5OH$) 213 m$\mu$ ($\epsilon$=26,700); 262 m$\mu$ ($\epsilon$=4,950). I.R.—(Principal bands; mineral oil mull) 3315, 3130, 1669, 1560, 1525, 1229, 1051 cm.$^{-1}$.

*Part B.—1,2-dihydro-1-hydroxy-4-diallylamino-6-ethyl-2-imino-1,3,5-triazine*

Finely-divided m-chloroperbenzoic acid (95% pure; 9.0 g.; 0.05 mole) was added gradually during 20 minutes to a stirred solution of 2-amino-4-diallylamino-6-ethyl-1,3,5-triazine (5.5 g.; 0.025 mole) in 150 ml. of absolute ethanol at 5° C. The resulting reaction mixture was stirred 8 hours at 0–5° C. and 15 hours while rising gradually to 25° C. Solvent was removed at reduced pressure, and a solution of 5 ml. of concentrated hydrochloric acid in 200 ml. of water was added to the white solid residue. This mixture was filtered. The filter cake was washed with water, and the combined filtrate and washings were adjusted to pH 9 with aqueous sodium hydroxide solution. The yellow oil which formed was collected and crystallized from a mixture of methanol and water to give 1.0 g. of unreacted starting triazine; M.P. 63–66° C. The aqueous alkaline solution was extracted with ten 100-ml. portions of chloroform. These extracts were combined, dried, and evaporated to give a yellow oil which crystallized and was recrystallized twice from acetonitrile to give 2.0 g. of 1,2-dihydro-1-hydroxy-4-diallylamino-6-ethyl-2-imino-1,3,5-triazine in the form of light-yellow needles which gave a dark brown ferric chloride test; M.P. 108.5–110° C.

*Analysis.*—Calcd. for $C_{11}H_{18}N_5O$: C, 56.15; H, 7.28; N, 29.77; O, 6.80. Found: C, 55.88; H, 7.39; N, 29.06; O, 7.42. U.V.—($H_2O$) 255 m$\mu$ ($\epsilon$=16,000); 305 m$\mu$ ($\epsilon$=5,700). (0.01 N HCl)) 226 m$\mu$ $\epsilon$=16,800); 241 m$\mu$ ($\epsilon$=15,200); 260 m$\mu$ (sh.) ($\epsilon$=7,700). (0.01 N KOH) 255 m$\mu$ ($\epsilon$=15,200); 305 m$\mu$ ($\epsilon$=5,450). I.R.—(Principal bands; mineral oil mull) 3280, 3070, 1689, 1657, 1584, 1520, 1256, 1162 cm.$^{-1}$.

Addition of absolute ethanol containing one equivalent of hydrogen chloride to an absolute ethanol solution of 1,2-dihydro-1-hydroxy-4-diallylamino-6-ethyl-2-imino-1,3,5-triazine followed by addition of about 4 volumes of diethyl ether gives the triazine monohydrochloride. Use of 2 equivalents of hydrogen chloride in this procedure gives the dihydrochloride. Similar use of one equivalent of benzoic acid gives the monobenzoic acid addition salt.

EXAMPLE 5

*Part A.—2-amino-4-methyl-6-morpoholino-1,3,5-triazine*

Sodium metal (9.7 g.; 0.42 gram atom) was reacted with 300 ml. of methanol, and the mixture was added rapidly to a stirred solution of 1,1-(3-oxapentamethylene) biguanide hydrochloride (43.5 g.; 0.21 mole) in 100 ml. of methanol at 25° C. Ethyl acetate (21.1 g.; 0.24 mole) was then added to the resulting stirred mixture at 25° C. After stirring for 51 hours at 25° C., the mixture was diluted with water to 2 liters and the resulting precipitate was filtered. Additional precipitate was obtained by concentrating the filtrate first to about 1000 ml. and then to about 100 ml., cooling and filtering after each concentration. The combined precipitates were recrystallized from water to yield 25.7 g. of white, solid 2-amino-4-methyl-6-morpholino-1,3,5-triazine; M.P. 184–185° C. (sublimes slowly).

*Analysis.*—Calcd. for $C_8H_{13}N_5O$: C, 49.22; H, 6.71. Found: C, 48.71; H, 6.23. U.V.—($H_2O$) 214 m$\mu$ ($\epsilon$=23,350); 226 m$\mu$ (sh.) ($\epsilon$=21,200); 261 m$\mu$ ($\epsilon$=4,650). I.R.—(Principal bands; mineral oil mull) 3385, 3140, 1656, 1567, 1545, 1525, 1243, 1112, 1103, 1065 cm.$^{-1}$.

*Part B.—1,2-dihydro-1-hydroxy-2-imino-6-methyl-4-morpholino-1,3,5-triazine*

Following the procedure of Example 4, Part B, 2-amino-4-methyl-6-morpholino-1,3,5-triazine (4.9 g.; 0.025 mole) was oxidized with m-chloroperbenzoic acid (95% pure; 9.0 g.; 0.05 mole) in 150 ml. of absolute ethanol. The residue obtained from the combined chloroform extracts was recrystallized from acetonitrile to give 0.7 g. of 1,2-dihydro-1-hydroxy-2-imino-6-methyl-4-morpholino-1,3,5-triazine in the form of a white solid; M.P. 254–255° C.

*Analysis.*—Calcd. for $C_8H_{13}N_5O_2$: C, 45.49; H, 6.20. Found: C, 44.97; H, 5.73. U.V.—($H_2O$) 256 m$\mu$ ($\epsilon$=16,050); 305 m$\mu$ ($\epsilon$=5,500). (0.01 N HCl) 227 m$\mu$ ($\epsilon$=16,650); 242 m$\mu$ ($\epsilon$=15,450). (0.01 N KOH) 256 m$\mu$ ($\epsilon$=16,000); 305 m$\mu$ ($\epsilon$=5,500). I.R.—Principal bands; mineral oil mull) 3400, 1665, 1575, 1525, 1480, 1260, 1173, 1115 cm.$^{-1}$.

Addition of absolute ethanol containing one equivalent of hydrogen chloride to an absolute ethanol solution of 1,2-dihydro - 1-hydroxy-2-imino - 6-methyl-4-morpholino-1,3,5-triazine followed by addition of about 4 volumes of diethyl ether gives the triazine monohydrochloride. Use of 2 equivalents of hydrogen chloride in this procedure gives the dihydrochloride. Similar use of one molecular amount of phosphoric acid gives the monophosphoric acid addition salt.

EXAMPLE 6

*1,2-dihydro-1-hydroxy-2-imino-6-methyl-4-piperidino-1,3,5-triazine*

Following the procedure of Example 4, Part B, 2-amino-4-methyl-6-piperidino - 1,3,5-triazine is oxidized with m-chloroperbenzoic acid to give 1,2-dihydro-1-hydroxy-2-imino-6-methyl-4-piperidino-1,3,5-triazine.

EXAMPLE 7

*Part A.—5-cyclohexyl-1,1-ethylenebiguanide*

Following the procedure of Shapiro et al., J. Am. Chem. Soc., 81, 4635–9 (1959), ethylenimine hydrochloride is fused with 3-cyclohexyl-1-cyanoguanidine to yield 5-cyclohexyl-1,1-ethylenebiguanide hydrochloride.

Part B.—2-(1-aziridinyl)-4-cyclohexylamino-6-methyl-1,3,5-triazine

Following the procedure of Example 5, Part A, 5-cyclohexyl-1,1-ethylenebiguanide hydrochloride is reacted with ethyl acetate in the presence of sodium methoxide and methanol to give 2-(1-aziridnyl)-4-cyclohexylamino-6-methyl-1,3,5-triazine.

Part C.—1,2-dihydro-1-hydroxy-4-(1-aziridinyl)-2-cyclohexylimino-6-methyl-1,3,5-triazine Following the procedure of Example 4, Part B, 2-(1-aziridinyl)-4-cyclohexylamino - 6-methyl-1,3,5-triazine is oxidized with m-chloroperbenzoic acid to give 1,2-dihydro-1-hydroxy - 4-(1-aziridinyl) - 2-cyclohexylimino-6-methyl-1,3,5-triazine.

EXAMPLE 8

Part A.—2-amino-4-benzyl-6-diallylamino-1,3,5-triazine

Sodium metal (9.2 g.; 0.40 gram atom) was reacted with 300 ml. of ethanol, and the mixture was added rapidly to a stirred solution of 1,1-diallylbiguanide hydrochloride (43.5 g.; 0.20 mole) in 100 ml. of ethanol at about 25° C. Ethyl phenylacetate (36.1 g; 0.22 mole) was then added to the resulting stirred mixture at 25° C. After stirring for 54 hours at 25° C., the reaction mixture was diluted to 2000 ml. with water and cooled. The solid which precipitated was filtered and recrystallized from a mixture of methanol and water to give 28.7 g. of 2-amino-4-benzyl-6-diallylamino-1,3,5-triazine, M.P. 58–60° C.

*Analysis.*—Calcd. for $C_{16}H_{19}N_5$: C, 68.30; H, 6.81; N, 24.89. Found: C, 68.26; H, 6.99; N, 24.18. U.V.—($C_2H_5OH$) 211 m$\mu$ ($\epsilon$=33,600); 265 m$\mu$ ($\epsilon$=4,900). I.R.—(Principal bands; mineral oil mull) 3365, 3310, 3205, 3155, 3090, 3030, 1642, 1535, 1495, 1256, 1193, 1146, 760, 711, 686 cm.$^{-1}$.

Part B.—1,2-dihydro-1-hydroxy-6-benzyl-4-diallylamino-2-imino-1,3,5-triazine Following the procedure of Example 4, Part B, 2-amino-4-benzyl-6-diallylamino-1,3,5-triazine (7.0 g.; 0.025 mole) was oxidized with m-chloroperbenzoic acid (95% pure; 9.0 g.; 0.05 mole) in 150 ml. of absolute ethanol. There was obtained 1,2-dihydro-1-hydroxy-6-benzyl-4-diallylamino-2-imino-1,3,5-triazine in the form of an oil which did not crystallize and which gave a positive ferric chloride test.

U.V.—($H_2O$) 259 m$\mu$ ($\epsilon$=11,650); 310 m$\mu$ ($\epsilon$=3,250). (0.01 N HCl) 225 m$\mu$ ($\epsilon$=17,550); 242 m$\mu$ $\epsilon$=14,400). (0.01 N KOH) 259 m$\mu$ ($\epsilon$=11,650); 307 m$\mu$ ($\epsilon$=3,650).

EXAMPLE 9

Part A.—2-amino-4-butyl-6-diallylamino-1,3,5-triazine

Following the procedure of Example 8, Part A, 1,1-diallylbiguanide hydrochloride (43.5 g.; 0.20 mole) was reacted with ethyl valerate (28.6 g.; 0.22 mole) in the presence of sodium ethoxide and ethanol. A 48-hour reaction time was used. The oil which separated on dilution of the reaction mixture with water crystallized on cooling at about 5–10° C. for 4 days. This material was recrystallized from a mixture of methanol and water at 0° C. to give 35.8 g. of 2-amino-4-butyl-6-diallylamino-1,3,5-triazine in the form of white crystals; M.P. 32–34° C.

*Analysis.*—Calcd. for $C_{13}H_{21}N_5$: C, 63.12; H, 8.56; N, 28.32. Found: C, 63.36; H, 8.94; N, 27.95. U.V.—($C_2H_5OH$) 214 m$\mu$ ($\epsilon$=26,100); 231 m$\mu$ (sh.) ($\epsilon$=22,800); 263 m$\mu$ ($\epsilon$=5,400). I.R.—(Principal bands; mineral oil mull) 3495, 3320, 3150, 3090, 1645, 1560, 1535, 1305, 1246, 1196 cm.$^{-1}$.

Part B.—1,2-dihydro-1-hydroxy-6-butyl-4-diallylamino-2-imino-1,3,5-triazine

Following the procedure of Example 4, Part B, 2-amino-4-butyl-6-diallylamino-1,3,5-triazine (6.2 g.; 0.025 mole) was oxidized with m-chloroperbenzoic acid (95% pure; 9.0 g.; 0.05 mole). There was obtained 1.05 g. of 1,2-dihydro-1-hydroxy-6-butyl-4-diallylamino-2-imino-1,3,5-triazine in the form of a white solid which gave a positive ferric chloride test; M.P. 82–85° C.

*Analysis.*—Calcd. for $C_{13}H_{21}N_5O$: C, 59.29; H, 8.04. Found: C, 58.97; H,7.57. U.V.—($C_2H_5OH$) 212 m$\mu$ ($\epsilon$=26,450); 258 m$\mu$ ($\epsilon$=16,100); 308 m$\mu$ ($\epsilon$=6,000). I.R.—(Principal bands; mineral oil mull) 3340, 3070, 1640, 1585, 1525, 1260, 1152, 1109, 1006 cm.$^{-1}$.

EXAMPLE 10

Part A.—2-dimethylamino-4-octyl-6-propylamino-1,3,5-triazine

Following the procedure of Example 8, Part A, 1,1-dimethyl-5-propylbiguanide hydrochloride is reacted with ethyl nonanoate in the presence of sodium ethoxide and ethanol to give 2-dimethyl-amino-4-octyl-6-propylamino-1,3,5-triazine.

Part B.—1,2-dihydro-1-hydroxy-4-dimethylamino-6-octyl-2-propyl-imino-1,3,5-triazine Following the procedure of Example 4, Part B, 2-dimethylamino-4-octyl - 6-propylamino - 1,3,5-triazine is oxidized with m-chloroperbenzoic acid to give 1,2-dihydro-1-hydroxy-4 - dimethylamino-6-octyl-2-propylamino-1,3,5-triazine.

EXAMPLE 11

Part A.—2-amino-4-cyclohexyl-6-diallylamino-1,3,5-triazine

Following the procedure of Example 8, Part A, 1,1-diallylbiguanide hydrochloride (43.5 g.; 0.20 mole) was reacted with methyl cyclohexanecarboxylate (31.0 g.; 0.22 mole) in the presence of sodium ethoxide and ethanol. A 48-hour reaction time was used. The product was recrystallized from a mixture of methanol and water to give 31.9 g. of 2-amino-4-cyclohexyl-6-diallylamino-1,3,5-triazine in the form of colorless needles; M.P. 90–92° C.

*Analysis.*—Calcd. for $C_{15}H_{23}N_5$: C, 65.90; H, 8.48; N, 25.62. Found: C, 66.31; H, 8.44; N, 25.15. U.V.—($C_2H_5OH$) 231 m$\mu$ (sh.) ($\epsilon$=2,000); 262 m$\mu$ ($\epsilon$=503). I.R.—(Principal bands; mineral oil mull) 3320, 3105, 1660, 1646, 1585–1490 (broad band), 1245, 1215, 1188, 1070 cm.$^{-1}$.

Part B.—1,2-dihydro-1-hydroxy-6-cyclohexyl-4-diallylamino-2-imino-1,3,5-triazine Following the procedure of Example 4, Part B, 2-amino-4-cyclohexyl-6-diallylamino-1,3,5-triazine (6.8 g.; 0.025 mole) was oxidized with m-chloroperbenzoic acid (95% pure; 9.0 g.; 0.05 mole). The oil which precipitated from the aqueous alkaline solution and the residue which remained after evaporation of the combined chloroform extracts were combined and recrystallized from acetonitrile to give 1.9 g. of 1,2-dihydro-1-hydroxy-6-cyclohexyl-4-diallylamino-2-imino-1,3,5-triazine in the form of colorless needles; M.P. 139–142° C.

*Analysis.*—Calcd. for $C_{15}H_{23}N_5O$: C, 62.26; H, 8.01; N, 24.20. Found: C, 62.56; H, 7.74; N, 23.85. U.V.—($H_2O$) 255 m$\mu$ ($\epsilon$=16,300); 305 m$\mu$ ($\epsilon$=5,600). (0.01 N HCl) 226 m$\mu$ ($\epsilon$=18,500); 240 m$\mu$ (sh.) ($\epsilon$=16,050); 260 m$\mu$ ($\epsilon$=7,750). (0.01 N KOH) 255 m$\mu$ ($\epsilon$=16,300); 305 m$\mu$ ($\epsilon$=5,650). I.R.—(Principal bands; mineral oil mull) 3355, 3080, 1666, 1643, 1565, 1530, 1257, 1182, 1149, 1136 cm.$^{-1}$.

EXAMPLE 12

Part A.—2-amino-4-diallylamino-6-phenyl-1,3,5-triazine

Sodium metal (9.2 g.; 0.40 gram atom) was reacted with 200 ml. of methanol, and the mixture was added to a stirred solution of 1,1-diallylbiguanide hydrochloride (43.5 g.; 0.20 mole) in 100 ml. of methanol at about 25°

C. Methyl benzoate (29.9 g.; 0.22 mole) was then added to the resulting stirred mixture at 25° C. After stirring for 53 hours at 25° C., the reaction mixture was diluted to 2000 ml. with water. The precipitate which formed was filtered and recrystallize from methanol to give 25.6 g. of 2-amino-4-diallylamino-6-phenyl-1,3,5-triazine in the form of white crystals; M.P. 82–84° C. Addition of about 1000 ml. of water to the filtrate gave an additional 6.2 g. of the same product.

*Analysis.*—Calcd. for $C_{15}H_{17}N_5$: C, 67.39; H, 6.41; N, 26.20. Found: C, 67.12; H, 6.39; N, 25.71. U.V.— ($C_2H_5OH$) 220 m$\mu$ (sh.) ($\epsilon$=23,100); 242 m$\mu$ ($\epsilon$=32,600); 281 m$\mu$ (sh.) ($\epsilon$=5,150); 298 m$\mu$ (sh.) ($\epsilon$=3,000). I.R.—(Principal bands; mineral oil mull) 3325, 3165, 1650, 1589, 1545, 1525, 1246, 1179, 1165, 778, 705 cm.$^{-1}$.

*Part B.—1,2-dihydro-1-hydroxy-4-diallylamino-2-imino-6-phenyl-1,3,5-triazine*

Following the procedure of Example 4, Part B, 2-amino-4-diallylamino-6-phenyl-1,3,5-triazine (6.7 g.; 0.025 mole) was oxidized with m-chloroperbenzoic acid (95% pure; 9.0 g.; 0.05 mole). The oil which separated from the aqueous alkaline solution and the solid residue remaining after evaporation of the combined chloroform extracts were combined and recrystallized from a mixture of acetonitrile and diethyl ether to give 0.4 g. of 1,2-dihydro-1-hydroxy-4-diallylamino-2-imino-6-phenyl-1,3,5-triazine in the form of yellow crystals which gave a dark brown ferric chloride test; M.P. 135–145° C.

*Analysis.*—Calcd. for $C_{15}H_{17}N_5O$: C, 63.58; H, 6.05; N, 24.72. Found: C, 63.60; H, 5.56; N, 24.31. U.V.—($C_2H_5OH$) 259 m$\mu$ ($\epsilon$=27,300); 345 m$\mu$ ($\epsilon$=3,600). I.R.—(Principal bands; mineral oil mull) 3315, 1665, 1585, 1566, 1551, 1488, 1210, 1126, 765, 690 cm.$^{-1}$.

EXAMPLE 13

*1,2-dihydro-1-hydroxy-4-dimethylamino-2-imino-6-phenyl-1,3,5-triazine*

Following the procedure of Example 4, Part B, 2-amino-4-dimethylamino-6-phenyl-1,3,5-triazine is oxidized with m-chloroperbenzoic acid to give 1,2-dihydro-1-hydroxy-4-dimethylamino-2-imino-6-phenyl-1,3,5-triazine.

EXAMPLE 14

*Part A.—1-allyl-1-methylbiguanide hydrochloride*

Following the procedure of Shapiro et al., J. Am. Chem. Soc. 81, 3728–36 (1959), N-methylallylamine hydrochloride is fused with cyanoguanidine to give 1-allyl-1-methylbiguanide hydrochloride.

*Part B.—2-amino-4-(N-methylallylamino)-6-p-tolyl-1,3,5-triazine*

Following the procedure of Example 12, Part A, 1-allyl-1-methylbiguanide hydrochloride is reacted with methyl p-toluate in the presence of sodium methoxide and methanol to give 2-amino-4-(N-methylallylamino)-6-p-tolyl-1,3,5-triazine.

*Part C.—1,2-dihydro-1-hydroxy-2-imino-4-(N-methylallylamino)-6-p-tolyl-1,3,5-triazine*

Following the procedure of Example 4, Part B, 2-amino-4-(N-methylallylamino)-6-p-tolyl-1,3,5-triazine is oxidized with m-chloroperbenzoic acid to give 1,2-dihydro-1-hydroxy-2-imino - 4-(N-methylallylamino)-6-p-tolyl-1,3,5-triazine.

EXAMPLE 15

*Part A.—2-amino-4-diallylamino-6-(2-methoxyethyl)-1,3,5-triazine*

Sodium metal (13.8 g.; 0.60 gram atom) was reacted with 300 ml. of methanol, and the mixture was added to a stirred solution of 1,1-diallylbiguanide hydrochloride (65.3 g.; 0.30 mole) in 200 ml. of methanol at about 25° C. Methyl acrylate (30.1 g.; 0.35 mole) was then added to the resulting stirred mixture at 25° C. After stirring for 72 hours at 25° C., the reaction mixture was diluted to 2000 ml. with water. The oil which separated did not crystallize, and was extracted with five 200-ml. portions of methylene chloride. The combined extracts were washed with water, dried, and evaporated to give an oily residue which was distilled at reduced pressure to give 47.0 g. of 2-amino-4-diallylamino-6-(2-methoxyethyl)-1,3,5-triazine in the form of a colorless viscous oil; B.P. 144–160° C. at 0.2 to 0.7 mm.

*Analysis.*—Calcd. for $C_{12}H_{19}N_5O$: C, 57.81; H, 7.68; N, 28.09. Found: C, 57.73; H, 7.80; N, 27.81. U.V.—($C_2H_5OH$); 264 m$\mu$ ($\epsilon$=4,670); 212 m$\mu$ ($\epsilon$=25,320); 220 m$\mu$ (sh.) ($\epsilon$=23,840); 228 m$\mu$ (sh.) ($\epsilon$=21,720); 236 m$\mu$ (sh.) ($\epsilon$=16,320). I.R.—(Principal bands; no diluent) 3323, 3200, 3150, 3080, 1640, 1565, 1535, 1515, 1195, 1155, 1090 cm.$^{-1}$.

*Part B.—1,2-dihydro-1-hydroxy-4-diallylamino-2-imino-6-(2-methoxyethyl)-1,3,5-triazine*

Finely-divided m-chloroperbenzoic acid (91.5% pure; 11.3 g.; 0.06 mole) was added gradually during 20 minutes to a stirred solution of 2-amino-4-diallylamino-6-(2-methoxyethyl)-1,3,5-triazine (7.5 g.; 0.03 mole) in 350 ml. of absolute ethanol at 5° C. The resulting reaction mixture was stirred 8 hours at 0–5° C. and 15 hours while rising gradually to 25° C. At this point, a starch-iodide test for peracids was negative. Solvent was removed at reduced pressure to give a white solid to which was added a solution of 10 ml. of concentrated hydrochloric acid in 200 ml. of water. This mixture was filtered. The filter cake was washed with water, and the combined filtrate and washings were adjusted to pH 9 with aqueous sodium hydroxide solution. The yellow oil which formed was allowed to settle for 4 hours. The alkaline aqueous layer was decanted and extracted repeatedly with chloroform until a portion of a fresh extract did not give a dark color to ethanolic ferric chloride. The combined extracts were dried with sodium sulfate and evaporated to give a yellow oil which was crystallized from acetonitrile to give 3.75 g. of 1,2-dihydro-1-hydroxy-4-diallylamino-2-imino-6-(2-methoxyethyl)-1,3,5 - triazine in the form of a light-yellow solid which gave a dark brown color to ethanolic ferric chloride; M.P. 132–134° C.

*Analysis.*—Calcd. for $C_{12}H_{19}N_5O_2$: C, 54.32; H, 7.22; N, 26.40; O, 12.06. Found: C, 54.32; H, 6.80; N, 26.06; O, 12.43. U.V.—($H_2O$) 211 m$\mu$ ($\epsilon$=24,050); 255 m$\mu$ ($\epsilon$=16,050); 306 m$\mu$ ($\epsilon$=5,600). (0.01 N $H_2SO_4$) 227 m$\mu$ ($\epsilon$=18,450); 242 m$\mu$ (sh.) ($\epsilon$=15,200); 272 m$\mu$ (sh.) ($\epsilon$=5,800). (0.01 N NaOH) 255 m$\mu$ ($\epsilon$=16,300); 306 m$\mu$ ($\epsilon$=5,700). I.R.—(Principal bands; material oil mull) 3340, 2660, 1565, 1525, 1475, 1190, 1110, 1040, 775, 730, 705 cm.$^{-1}$.

Addition of absolute ethanol containing one equivalent of hydrogen chloride to an absolute ethanol solution of 1,2-dihydro-1-hydroxy-4-diallylamino-2 - imino - 6 - (2-methoxyethyl)-1,3,5-triazine followed by addition of about 4 volumes of diethyl ether gives the triazine monohydrochloride. Use of 2 equivalents of hydrogen chloride in this procedure gives the dihydrochloride. Similar use of one molecular amount of lactic acid gives the monolactic acid addition salt.

EXAMPLE 16

*Part A.—2-amino-4-diallylamino-6-(2-methoxypropyl)-1,3,5-triazine*

Following the procedure of Example 15, Part A, 1,1-diallylbiguanide hydrochloride (43.5 g.; 0.20 mole) was reacted with methyl crotonate (22.0 g.; 0.22 mole) in the presence of sodium methoxide and methanol. Distillation of the product gave 34.8 g. of 2-amino-4-diallylamino-6-(2-methoxypropyl)-1,3,5-triazine in the form of a colorless viscous oil; B.P. 145–147° C. at 0.25 to 0.40 mm.

*Analysis.*—Calcd. for $C_{13}H_{21}N_5O$: C, 59.29; H, 8.04; N, 26.60. Found: C, 59.36; H, 8.42; N, 26.17. U.V.—$(C_2H_5OH)$ 214 m$\mu$ ($\epsilon$=26,300); 226 m$\mu$ (sh.) ($\epsilon$=23,900); 264 m$\mu$ ($\epsilon$=4,550). I.R. — (Principal bands; no diluent) 3323, 3200, 3150, 3080, 1640, 1565, 1535, 1515, 1195, 1155, 1090 cm.$^{-1}$.

*Part B.*—*1,2-dihydro-1-hydroxy-4-diallylamino-2-imino-6-(2-methoxypropyl)-1,3,5-triazine*

Following the procedure of Example 15, Part B, 2-amino-4-diallylamino-6-(2-methoxypropyl)-1,3,5 - triazine (10.5 g.; 0.04 mole) was oxidized with m-chloroperbenzoic acid (91.5% pure; 15.1 g.; 0.08 mole) to give 1,2-dihydro-1-hydroxy-4-diallylamino-2-imino-6 - (2 - methoxypropyl)-1,3,5-triazine in the form of an oil which gave a positive ferric chloride test and which did not crystallize.

U.V. — $(H_2O)$ 211.5 m$\mu$ ($\epsilon$=23,800); 255 m$\mu$ ($\epsilon$=14,450); 307 m$\mu$ ($\epsilon$=4,450). (0.01 N $H_2SO_4$) 227 m$\mu$ ($\epsilon$=18,600); 244 m$\mu$ (sh.) ($\epsilon$=14,700); 270 m$\mu$ (sh.) ($\epsilon$=5,750). (0.01 N KOH) 255 m$\mu$ ($\epsilon$=14,500); 306 m$\mu$ ($\epsilon$=4,550). I.R.—(Principal bands; no diluent) 3300, 3070, 1648, 1585, 1530, 1483, 1175, 1155, 1085 cm.$^{-1}$.

EXAMPLE 17

*Part A.*—*2-amino-4-diallylamino-6-vinyl-1,3,5-triazine*

Sodium metal (9.2 g.; 0.40 gram atom) was reacted with 500 ml. of ethylene glycol monomethyl ether. To this mixture was added 1,1-diallylbiguanide hydrochloride (87.0 g.; 0.40 mole). The sodium chloride which precipitated was filtered. Methyl acrylate (34.4 g.; 0.40 mole) was added with stirring to this filtrate at 25° C. After stirring for an additional 63 hours at 25° C., the reaction mixture was concentrated at reduced pressure to about one-half its original volume and was then diluted with ice-water to 2000 ml. The oil which separated was extracted with four 250-ml. portions of methylene chloride, and the combined extracts were dried with sodium sulfate and evaporated. The oily residue was distilled at reduced pressure. The fraction which distilled at 138° to 168° C. at 0.45 to 1.0 mm. was collected separately. This fraction solidified and was recrystallized from a mixture of methanol and water to give 14.9 g. of 2-amino-4-diallylamino-6-vinyl-1,3,5-triazine in the form of a white solid; M.P. 64–65° C.

*Analysis.*—Calcd. for $C_{11}H_{15}N_5$: C, 60.80; H, 6.96. Found: C, 60.50; H, 6.59. U.V.—$(C_2H_5OH)$ 215 m$\mu$ ($\epsilon$=37,250); 226 m$\mu$ (sh.) ($\epsilon$=34,250); 290 m$\mu$ ($\epsilon$=2,900). I.R.—(Principal bands; mineral oil mull) 3310, 3130, 1666, 1649, 1530, 1238 cm.$^{-1}$.

*Part B.*—*1,2-dihydro-1-hydroxy-4-diallylamino-2-imino-6-vinyl-1,3,5-triazine*

Following the procedure of Example 15, Part B, 2-amino-4-diallylamino-6-vinyl-1,3,5-triazine (8.7 g.; 0.04 mole) was oxidized with m-chloroperbenzoic acid (91.5% pure; 15.1 g.; 0.08 mole). The oil which separated from the alkaline aqueous solution and the oil remaining after evaporation of the combined chloroform extracts were combined and adsorbed on a column of Florisil (60–100 mesh; a magnesium trisilicate; obtained from the Floridin Company, Warren, Pa.). After chloroform elution of 0.85 g. of starting triazine, elution with a mixture of equal volumes of methanol and chloroform followed by evaporation of the eluate gave 4.5 g. of 1,2-dihydro-1-hydroxy-4-diallylamino-2-imino-6-vinyl-1,3,5-triazine in the form of a viscous yellow oil which gave a dark brown color to alcoholic ferric chloride and which did not crystallize.

U.V.—$(H_2O)$ 208 m$\mu$ (end absorption); 253 m$\mu$ ($\epsilon$=6,550); 306 m$\mu$ ($\epsilon$=1,850). (0.01 N $H_2SO_4$) 227 m$\mu$ ($\epsilon$=10,100); 240 m$\mu$ (sh.) ($\epsilon$=8,450); 268 m$\mu$ (sh.) ($\epsilon$=2,700). (0.01 N KOH) 254 m$\mu$ ($\epsilon$=6,300); 307 m$\mu$ ($\epsilon$=1,700). I.R.—(Principal bands; no diluent) 3320, 3080, 1660, 1590, 1550, 1535, 1485, 1175, 1110, 1035, 755 cm.$^{-1}$.

EXAMPLE 18

*Part A.*—*2-allyl-4-amino-6-(2-methylpiperidino)-1,3,5-triazine*

Following the procedure of Example 17, Part A, 1,1-(1-methylpentamethylene)biguanide hydrochloride is reacted with methyl 3-butenoate to give 2-allyl-4-amino-6-(2-methylpiperidino)-1,3,5-triazine.

*Part B.*—*1,2-dihydro-1-hydroxy-6-allyl-2-imino-4-(2-methylpiperidino)-1,3,5-triazine*

Following the procedure of Example 15, Part B, 2-allyl-4-amino-6-(2-methylpiperidino)-1,3,5-triazine is oxidized with m-chloroperbenzoic acid to give 1,2-dihydro-1-hydroxy - 6-allyl - 2-imino-4-(2-methylpiperidino)-1,3,5-triazine.

EXAMPLE 19

*Part A.*—*2-amino-4-diallylamino-6-propyl-1,3,5-triazine*

Sodium metal (9.2 g.; 0.40 gram atom) was reacted with 200 ml. of methanol, and the mixture was added to a stirred solution of 1,1-diallylbiguanide hydrochloride (43.5 g.; 0.20 mole) in 100 ml. of methanol at about 25° C. Methyl butyrate (22.5 g.; 0.22 mole) was then added to the resulting stirred mixture at 25° C. After stirring for 69 hours at 25° C., the reaction mixture was poured into 1500 ml. of water at 0° C. The solid which precipitated was filtered and recrystallized from a mixture of methanol and water to give 33.2 g. of 2-amino-4-diallylamino-6-propyl-1,3,5-triazine in the form of white crystals; M.P. 50–52° C.

*Analysis.*—Calcd. for $C_{12}H_{19}N_5$: C, 61.77; H, 8.21; N, 30.02. Found: C, 62.17; H, 8.16; N, 29.74. U.V.—$(C_2H_5OH)$ 212 m$\mu$ ($\epsilon$=26,150); 226 m$\mu$ (sh.) ($\epsilon$=21,950); 262 m$\mu$ ($\epsilon$=4,950). I.R.—(Principal bands; mineral oil mull) 3320, 3150, 1646, 1525, 1245, 1200 cm.$^{-1}$.

*Part B.*—*1,2-dihydro-1-hydroxy-4-diallylamino-2-imino-6-propyl-1,3,5-triazine*

Following the procedure of Example 15, Part B, 2-amino-4-diallylamino-6-propyl-1,3,5-triazine (9.3 g.; 0.04 mole) was oxidized with m-chloroperbenzoic acid (91.5% pure; 15.1 g.; 0.08 mole). The oil which separated from the aqueous alkaline solution and the material which remained after evaporation of the combined chloroform extracts were combined and crystallized from acetonitrile to give 2.8 g. of 1,2-dihydro-1-hydroxy-4-diallylamino-2-imino-6-propyl-1,3,5-triazine in the form of a white solid which gave a dark brown color to ethanolic ferric chloride; M.P. 88–91° C.

*Analysis.*—Calcd. for $C_{12}H_{19}N_5O$: C, 57.81; H, 7.68; N, 28.09. Found: C, 57.87; H, 7.74; N, 27.95. U.V.—$(H_2O)$ 210 m$\mu$ ($\epsilon$=23,950); 255 m$\mu$ ($\epsilon$=14,650); 305 m$\mu$ ($\epsilon$=4,800). (0.01 N $H_2SO_4$) 226 m$\mu$ ($\epsilon$=18,150); 238 m$\mu$ (sh.) ($\epsilon$=15,700); 274 m$\mu$ (sh.) ($\epsilon$=5,100). (0.01 N KOH) 255 m$\mu$ ($\epsilon$=14,600); 303 m$\mu$ ($\epsilon$=4,700). I.R.—(Principal bands; mineral oil mull) 3340, 3060, 1655, 1640, 1585, 1525, 1175, 1155 cm.$^{-1}$.

EXAMPLE 20

*Part A.*—*2-amino-4-diallylamino-6-isopropyl-1,3,5-triazine*

Following the procedure of Example 19, Part A, 1,1-diallylbiguanide hydrochloride (43.5 g.; 0.20 mole) was reacted with methyl isobutyrate (22.5 g.; 0.22 mole). A 46-hour reaction time at 25° C. was used. The reaction product was recrystallized from a mixture of ethanol and water to give 26.4 g. of 2-amino-4-diallylamino-6-isopropyl-1,3,5-triazine in the form of a white solid; M.P. 49–51° C.

*Analysis.*—Calcd. for $C_{12}H_{19}N_5$: C, 61.77; H, 8.21; N, 30.02. Found: C, 62.32; H, 8.20; N, 29.56. U.V.—$(C_2H_5OH)$ 212 m$\mu$ ($\epsilon$=26,000); 230 m$\mu$ (sh.) ($\epsilon$=

20,050); 257 mμ (ε=5,050). I.R.—(Principal bands; mineral oil mull) 3320, 3150, 1646, 1525, 1245, 1200, 825, 695 cm.$^{-1}$.

*Part B.—1,2-dihydro-1-hydroxy-4-diallylamino-2-imino-6-isopropyl-1,3,5-triazine*

Following the procedure of Example 15, Part B, 2-amino-4-diallylamino-6-isopropyl-1,3,5-triazine (9.3 g.; 0.04 mole) was oxidized with m-chloroperbenzoic acid (46% pure; 30.0 g.; 0.08 mole). The reaction product was recrystallized twice from acetonitrile to give 1.2 g. of 1,2-dihydro-1-hydroxy-4-diallylamino-2-imino-6-isopropyl-1,3,5-triazine in the form of white crystals which gave a positive ferric chloride test; M.P. 119–121° C.

*Analysis.*—Calcd. for $C_{12}H_{19}N_5O$: C, 57.81; H, 7.68; N, 28.09. Found: C, 58.13; H, 7.78; N, 27.41. U.V.—($H_2O$) 210 mμ (end absorption); 255 mμ (ε=16,400); 303 mμ (ε=5,600). (0.01 N $H_2SO_4$) 226 mμ (ε=18,000); 239 mμ (ε=16,050); 272 mμ (sh.) (ε=6,000). (0.01 N KOH) 255 mμ (ε=16,400); 304 mμ (ε=5,700). I.R.—(Principal bands; mineral oil mull) 3340, 3075, 1690, 1662, 1642, 1583, 1530, 1255, 1152 cm.$^{-1}$.

EXAMPLE 21

*Part A.—2-amino-4-diallylamino-6-pentyl-1,3,5-triazine*

Following the procedure of Example 19, Part A, 1,1-diallylbiguanide hydrochloride (43.5 g.; 0.20 mole) was reacted with ethyl hexanoate (31.7 g.; 0.22 mole). A 70-hour reaction time was used. When the reaction mixture was poured into water, the product separated as an oil which did not crystallize. This oil was extracted with 1000 ml. of methylene chloride in several portions. The combined extracts were dried with sodium sulfate. Evaporation of the solvent gave a viscous residue which was distilled under reduced pressure to give 35.3 g. of 2-amino-4-diallylamino-6-pentyl-1,3,5-triazine in the form of a colorless viscous oil; B.P. 155–157° C. at 1 mm.

*Analysis.*—Calcd. for $C_{14}H_{23}N_5$: C, 64.33; H, 8.87; N, 26.80. Found: C, 63.78; H, 8.82; N, 26.32. U.V.—($C_2H_5OH$) 212 mμ (ε=25,800); 224 mμ (sh.) (ε=22,350); 263 mμ (ε=5,000). I.R.—(Principal bands; no diluent) 3480, 3320, 3200, 3150, 3080, 1660, 1640, 1575, 1550, 1525, 1245, 1195, 1115, 1050 cm.$^{-1}$.

*Part B.—1,2-dihydro-1-hydroxy-4-diallylamino-2-imino-6-pentyl-1,3,5-triazine*

Following the procedure of Example 15, Part B, 2-amino-4-diallylamino-6-pentyl-1,3,5-triazine (10.45 g.; 0.04 mole) was oxidized with m-chloroperbenzoic acid (91.5% pure; 15.1 g.; 0.08 mole) in a mixture of 200 ml. of absolute ethanol and 100 ml. of methanol. There was obtained from the chloroform extracts, 1.3 g. of 1,2-dihydro - 1 - hydroxy-4-diallylamino-2-imino-6-pentyl-1,3,5-triazine in the form of a yellow oil which gave a dark brown color to ethanolic ferric chloride and which did not crystallize.

U.V.—($H_2O$) 210 mμ (ε=19,400); 254 mμ (ε=9,150); 304 mμ (ε=2,700). (0.01 N $H_2SO_4$) 224 mμ (ε=14,950); 237 mμ (ε=12,800); 268 mμ (sh.) (ε=4,250). (0.01 N KOH) 234 mμ (sh.) (ε=8,950); 254 mμ (ε=8,900); 304 mμ (ε=2,600).

EXAMPLE 22

*Part A.—2-amino-4-p-chlorobenzyl-6-diallylamino-1,3,5-triazine*

Sodium metal (11.5 g.; 0.50 gram atom) was reacted with 350 ml. of methanol, and the mixture was added rapidly to a stirred solution of 1,1-diallylbiguanide hydrochloride (50.5 g.; 0.25 mole) in 100 ml. of methanol at about 25° C. Methyl p-chlorophenylacetate (50.6 g.; 0.27 mole) was then added to the resulting stirred mixture at 25° C. After stirring for 111 hours at 25° C., the reaction mixture was diluted to 2000 ml. with water. The solid which precipitated was filtered and recrystallized from a mixture of methanol and water to give 53.3 g. of 2-amino-4-p-chlorobenzyl-6-diallylamino-1,3,5-triazine in the form of colorless needles; M.P. 87–89° C.

*Analysis.*—Calcd. for $C_{16}H_{18}ClN_5$: C, 60.85; H, 5.74; Cl, 11.23. Found: C, 60.76; H, 5.62; Cl, 11.44. U.V.—($C_2H_5OH$) 216 mμ (ε=34,250); 265 mμ (ε=4,750); 276 mμ (sh.) (ε=3,450). I.R.—(Principal bands; mineral oil mull) 3470, 3330, 3130, 3100, 1645, 1563, 1546, 1524, 1486, 1250, 1190, 1178, 1148, 1086, 1015, 754 cm.$^{-1}$.

*Part B.—1,2-dihydro-1-hydroxy-6-p-chlorobenzyl-4-diallylamino-2-imino-1,3,5-triazine*

Following the procedure of Example 15, Part B, 2-amino-4-p-chlorobenzyl-6-diallylamino-1,3,5-triazine (12.6 g.; 0.04 mole) was oxidized with m-chloroperbenzoic acid (91.5% pure; 15.1 g.; 0.08 mole) in a mixture of 300 ml. of absolute ethanol and 250 ml. of methanol. The initial white solid reaction product was treated four times with a mixture of water and concentrated hydrochloric acid rather than only once, being filtered and washed with water after each treatment. Each aqueous acidic filtrate was combined with the corresponding washing and adjusted to pH 9 with aqueous sodium hydroxide solution. In each case, the yellow oil which formed was allowed to settle for four hours. Aqueous layers were decanted and each was extracted repeatedly with chloroform. All chloroform extracts were dried and evaporated to give a residue which was combined with all other portions of yellow oil, the whole being dissolved in about 30 ml. of chloroform. This chloroform solution was dried and adsorbed on a column of Florisil (60–100 mesh). After chloroform elution of unreacted starting triazine, elution with a mixture of equal volumes of methanol and chloroform followed by evaporation of the eluate gave 4.45 g. of 1,2-dihydro-1-hydroxy-6-p-chlorobenzyl-4-diallylamino-2-imino-1,3,5-triazine in the form of an amorphous yellow solid which did not crystallize from the usual crystallization solvents; M.P. 65–80° C.

U.V.—($C_2H_5OH$) 211 mμ (sh.) (ε=31,850); 259 mμ (ε=12,200); 313 mμ (ε=3,950). (0.01 N ethanolic $H_2SO_4$) 228 mμ (sh.) (ε=21,150); 248 mμ (sh.) (ε=11,800); 270 mμ (sh.) (ε=5,950). (0.01 N ethanolic KOH) 260 mμ (ε=11,800); 313 mμ (ε=3,950). I.R.—(Principal bands; mineral oil mull) 3460, 3300, 3065, 1655, 1645, 1575, 1485, 1255, 1087, 1014, 752 cm.$^{-1}$.

EXAMPLE 23

*Part A.—2-amino-4-p-methylbenzyl-6-(1-pyrrolidinyl)-1,3,5-triazine*

Following the procedure of Example 22, Part A, 1,1-tetramethylenebiguanide hydrochloride is reacted with methyl p-methylphenylacetate in the presence of sodium methodixe and methanol to give 2-amino-4-p-methylbenzyl-6-(1-pyrrolidinyl)-1,3,5-triazine.

*Part B.—1,2-dihydro-1-hydroxy-2-imino-6-p-methylbenzyl-4-(1-pyrrolidinyl)-1,3,5-triazine*

Following the procedure of Example 15, Part B, 2-amino - 4-p-methylbenzyl-6-(1-pyrrolidinyl)-1,3,5-triazine is oxidized with m-chloroperbenzoic acid to give 1,2-dihydro - 1-hydroxy-2-imino-6-p-methylbenzyl-4-(1-pyrrolidinyl)-1,3,5-triazine.

EXAMPLE 24

*Part A.—2-amino-4-(1-hexahydroazepinyl)-6-p-methoxybenzyl-1,3,5-triazine*

Following the procedure of Example 22, Part A, 1,1-hexamethylenebiguanide hydrochloride is reacted with methyl p-methoxyphenylacetate in the presence of sodium methoxide and methanol to give 2-amino-4-(1-hexahydroazepinyl)-6-p-methoxybenzyl-1,3,5-triazine.

*Part B.—1,2-dihydro-1-hydroxy-4-(1-hexahydroazepinyl)-2-imino-6-p-methoxybenzyl-1,3,5-triazine*

Following the procedure of Example 15, Part B, 2-amino - 4 - (1-hexahydroazepinyl)-6-p-methoxybenzyl)-1,3,5-triazine is oxidized with m-chloroperbenzoic acid to give 1,2 - dihydro-1-hydroxy-4-(1-hexahydroazepinyl)-2-imino-6-p-methoxybenzyl-1,3,5-triazine.

EXAMPLE 25

*Part A.—2-amino-4-diallylamino-6-phenethyl-1,3,5-triazine*

Following the procedure of Example 19, Part A, 1,1-diallylbiguanide hydrochloride (43.5 g.; 0.20 mole) was reacted with methyl 3-phenylpropionate (36.1 g.; 0.22 mole). A 45-hour reaction time was used. The oil which formed when the reaction mixture was poured into water did not crystallize and was extracted with four 250-ml. portions of methylene chloride. The combined extracts were dried with sodium sulfate and evaporated to give a viscous residue which was distilled under reduced pressure to give 37.8 g. of 2-amino-4-diallylamino-6-phenethyl-1,3,5-triazine in the form of a viscous liquid; B.P. 180–182° C. at 0.3 mm.

*Analysis.*—Calcd. for $C_{17}H_{21}N_5$: C, 69.12; H, 7.17; N, 23.71. Found: C, 69.13; H, 6.90; N, 23.30. U.V.—($C_2H_5OH$) 210 m$\mu$ ($\epsilon$=34,550); 228 m$\mu$ (sh.) ($\epsilon$=22,750) 262 m$\mu$ ($\epsilon$=4,900). I.R.—(Principal bands; no diluent) 3470, 3320, 3150, 3080, 3050, 1650, 1545, 1236, 810, 690 cm.$^{-1}$.

*Part B.—1,2-dihydro-1-hydroxy-4-diallylamino-2-imino-6-phenethyl-1,3,5-triazine*

Finely divided m-chloroperbenzoic acid (91.5% pure; 15.1 g.; 0.08 mole) was added gradually during 20 minutes to a stirred solution of 2-amino-4-diallylamino-6-phenethyl-1,3,5-triazine (11.8 g.; 0.04 mole) in 150 ml. of absolute ethanol at 5° C. The resulting reaction mixture was stirred 7 hours at 0–5° C. Solvent was then removed at reduced pressure and 100 ml. of water was added to the residue. The mixture was made alkaline with aqueous sodium hydroxide solution and extracted with five 50-ml. portions of chloroform. The combined extracts were dried with sodium sulfate and evaporated. Trituration of the residue with acetonitrile produced a solid which was recrystallized from acetonitrile to give 6.15 g. of 1,2-dihydro-1-hydroxy-4-diallylamino-2-imino-6-phenethyl - 1,3,5-triazine in the form of white needles which gave a dark brown color to ethanolic ferric chloride; M.P. 118–120° C.

*Analysis.*—Calcd. for $C_{17}H_{21}N_5O$: C, 65.57; H, 6.80; N, 22.49. Found: C, 65.86; H, 6.53; N, 22.27. U.V.—($H_2O$) 209 m$\mu$ (end absorption); 256 m$\mu$ ($\epsilon$=16,150); 306 m$\mu$ ($\epsilon$=5,450). (0.01 N $H_2SO_4$) 224 m$\mu$ (sh.) ($\epsilon$=30,350); 250 m$\mu$ ($\epsilon$=18,300); 262 m$\mu$ (sh.) ($\epsilon$=15,500). (0.01 N KOH) 256 m$\mu$ ($\epsilon$=16,050); 306 m$\mu$ ($\epsilon$=5,400). I.R.—(Principal bands; mineral oil mull) 3400, 3270, 3070, 3020, 1665, 1640, 1580, 1525, 1485, 1263, 1182, 768, 690 cm.$^{-1}$.

A solution of 1,2-dihydro-1-hydroxy-4-diallylamino-2-imino-6-phenethyl-1,3,5-triazine in water containing one equivalent of hydrochloric acid (about 1% hydrochloric acid) gives the monohydrochloride when evaporated to dryness. Similar use of 2 equivalents of hydrochloric acid gives the dihydrochloride. Similar use of one molecular amount of sulfuric acid gives the monosulfuric acid addition salt.

EXAMPLE 26

*Part A.—2-amino-4-diallylamino-6-(3-phenylpropyl)-1,3,5-triazine*

Following the procedure of Example 19, Part A, 1,1-diallylbiguanide (43.5 g.; 0.20 mole) was reacted with methyl 4-phenylbutyrate (39.2 g.; 0.22 mole). A 48-hour reaction time was used. The reaction product was recrystallized from hexane to give two crops (16.85 g. total) of 2 - amino-4-diallylamino-6-(3-phenylpropyl)-1,3,5-triazine in the form of yellow crystals; M.P. 57–60° C.

*Analysis.*—Calcd. for $C_{18}H_{23}N_5$: C, 69.87; H, 7.49; N, 22.64. Found: C, 69.82; H, 7.41; N, 22.02. U.V.—($C_2H_5OH$) 209 m$\mu$ ($\epsilon$=33,600); 228 m$\mu$ (sh.) ($\epsilon$=21,850); 260 m$\mu$ ($\epsilon$=5,400). I.R.—(Principal bands; mineral oil mull) 3305, 3100, 3010, 1655, 1525, 1243, 735, 693 cm.$^{-1}$.

*Part B.—1,2-dihydro-1-hydroxy-4-diallylamino-2-imino-6-(3-phenylpropyl)-1,3,5-triazine*

Following the procedure of Example 25, Part B, 2-amino-4-diallylamino-6-(3-phenylpropyl) - 1,3,5 - triazine (10.15 g.; 0.033 mole) was oxidized with m-chloroperbenzoic acid (91.5% pure; 12.4 g.; 0.066 mole). The reaction mixture was stirred for an additional 60 hours at 25° C. The reaction product was an oil which did not crystallize. The oil was dissolved in chloroform and adsorbed on a column of Florisil (60–100 mesh). After elution of 1.4 g. of unreacted starting triazine with 100 ml. of chloroform, further elution first with 3000 ml. of chloroform and then with 500 ml. of chloroform containing 20% by volume of methanol gave eluates which were combined and evaporated. The resulting residue was recrystallized twice from acetonitrile to give 3.2 g. of 1,2-dihydro - 1 - hydroxy - 4 - diallylamino - 2 - imino - 6 - (3-phenylpropyl)-1,3,5-triazine in the form of a white solid which gave a dark brown color to ethanolic ferric chloride; M.P. 91–93° C.

*Analysis.*—Calcd. for $C_{18}H_{23}N_5O$: N, 21.52. Found: N, 21.08. U.V.—($H_2O$) 255 m$\mu$ ($\epsilon$=15,250); 305 m$\mu$ ($\epsilon$=5,250). (0.01 N $H_2SO_4$) 226 m$\mu$ ($\epsilon$=17,800); 240 m$\mu$ (sh.) ($\epsilon$=15,200); 274 m$\mu$ (sh.) ($\epsilon$=5,300). (0.01 N NaOH) 251 m$\mu$ ($\epsilon$=14,850); 301 m$\mu$ ($\epsilon$=4,900). I.R.—(Principal bands; mineral oil mull) 3330, 3050, 1660, 1640, 1583, 1515, 1167, 763, 685 cm.$^{-1}$.

EXAMPLE 27

*Part A.—2-amino-4-cyclopropyl-6-diallylamino-1,3,5-triazine*

Following the procedure of Example 19, Part A, 1,1-diallylbiguanide hydrochloride (52.2 g.; 0.24 mole) was reacted with methyl cyclopropanecarboxylate (26.0 g.; 0.26 mole). A 42-hour reaction time was used. The reaction product was recrystallized from a mixture of ethanol and water to give 26.2 g. of 2-amino-4-cyclopropyl-6-diallylamino-1,3,5-triazine in the form of a white solid; M.P. 55–57.5° C.

*Analysis.*—Calcd. for $C_{12}H_{17}N_5$: C, 62.31; H, 7.41; N, 30.28. Found: C, 62.03; H, 7.21; N, 29.70. U.V.—($C_2H_5OH$) 206 m$\mu$ (end absorption); 224 m$\mu$ (sh.) ($\epsilon$=24,150); 262 m$\mu$ ($\epsilon$=4,400). I.R.—(Principal bands; mineral oil mull) 3320, 3130, 3080, 1660, 1640, 1540, 1015 cm.$^{-1}$.

*Part B.—1,2-dihydro-1-hydroxy-6-cyclopropyl-4-diallylamino-2-imino-1,3,5-triazine*

Following the procedure of Example 25, Part B, 2-amino-4-cyclopropyl-6-diallylamino-1,3,5 - triazine (9.25 g.; 0.04 mole) was oxidized with m-chloroperbenzoic acid (54% pure; 25.5 g.; 0.08 mole) in 250 ml. of absolute ethanol. After a 7-hour reaction period at 0–5° C., sodium methoxide (4.05 g.; 0.075 mole) was added and the reaction mixture was stirred for an additional 15 hours at 25° C. Solvent was then removed at reduced pressure and 100 ml. of water was added to the residue. Solid unreacted starting triazine (5.45 g.) was removed by filtration, and the filtrate was extracted with chloroform as in Example 25, Part B. The residue obtained by evaporation of the combined chloroform extracts was recrystallized four times from acetonitrile to give 0.6 g. of 1,2-dihydro - 1 - hydroxy - 6 - cyclopropyl - 4 - diallylamino-2-imino-1,3,5-triazine in the form of a white solid which gave a positive ferric chloride test; M.P. 104–106° C. (sintered at 102° C.).

*Analysis.*—Calcd. for $C_{12}H_{17}N_5O$: N, 28.32. Found: N, 28.14. U.V.—($H_2O$) 253 m$\mu$ ($\epsilon=11,400$); 304 m$\mu$ ($\epsilon=3,000$). (0.01 N $H_2SO_4$) 227 m$\mu$ ($\epsilon=23,400$); 240 m$\mu$ (sh.) ($\epsilon=19,200$); 270 m$\mu$ (sh.) ($\epsilon=5,550$). (0.01 N KOH) 254 m$\mu$ ($\epsilon=11,400$); 305 m$\mu$ ($\epsilon=3,000$). I.R.—(Principal bands; mineral oil mull) 3285, 3240, 3195, 3080, 3010, 1675, 1650, 1588, 1545, 1530, 1242, 1190, 1115 cm.$^{-1}$.

Following the procedure of Example 1, Part B; Example 5, Part B; Example 15, Part B; or Example 25, Part B, the mono- and diacid addition salts of 1,2-dihydro-1-hydroxy - 6 - cyclopropyl - 4 - diallylamino-2-imino-1,3,5-triazine with hydrochloric acid, sulfuric acid, phosphoric acid, lactic acid, benzoic acid, and succinic acid are prepared.

EXAMPLE 28

*Part A.—2-allylamino-4-chloro-6-methyl-1,3,5-triazine*

A solution of 2,4-dichloro-6-methyl-1,3,5-triazine (16.4 g.; 0.10 mole) in 125 ml. of diethyl ether was added to a stirred solution of allylamine (11.4 g.; 0.20 mole) in 225 ml. of diethyl ether during 90 minutes at 0–5° C. The resulting precipitate of allylamine hydrochloride was filtered, and solvent was removed from the filtrate at reduced pressure. The oily residue was crystallized from hexane, thereby separating 13.4 g. of solid product from unreacted starting triazine. This product was recrystallized from hexane to give 11.9 g. of 2-allylamino-4-chloro-6-methyl-1,3,5-triazine; M.P. 53–56° C.

*Analysis.*—Calcd. for $C_7H_9ClN_4$: Cl, 16.42; N, 30.35. Found: Cl, 16.42; N, 30.58. U.V.—($C_2H_5OH$) 232 m$\mu$ ($\epsilon=20,800$); 264 m$\mu$ (sh.) ($\epsilon=2,150$). I.R.—(Principal bands; mineral oil mull) 3270, 3120, 1650, 1612, 1565, 1535, 1275, 1175, 1141 cm.$^{-1}$.

*Part B.—2-allylamino-4-diallylamino-6-methyl-1,3,5-triazine*

A solution of diallylamine (9.7 g.; 0.10 mole) in 50 ml. of dimethylformamide was added to a solution of 2-allylamino-4-chloro-6-methyl-1,3,5-triazine (9.2 g.; 0.05 mole) in 50 ml. of dimethylformamide at about 25° C. The mixture was heated at 100° C. for 2 hours, and was then cooled to about 30° C. and diluted to 500 ml. with water. The solid which precipitated was filtered, and was twice dissolved in ethanol and precipitated with water to give 9.0 g. of 2-allylamino-4-diallylamino-6-methyl-1,3,5-triazine; M.P. 40–41.5° C.

*Analysis.*—Calcd. for $C_{13}H_{19}N_5$: C, 63.64; H, 7.81; N, 28.55. Found: C, 64.29; H, 7.40; N, 28.26. U.V.—($C_2H_5OH$) 225 m$\mu$ ($\epsilon=35,700$); 266 m$\mu$ ($\epsilon=5,100$). I.R.—(Principal bands; mineral oil mull) 3460, 3270, 3140, 3095, 1642, 1605, 1585, 1538, 1515, 1500, 1226 cm.$^{-1}$.

*Part C.—1,2-dihydro-1-hydroxy-2-allylimino-4-diallylamino-6-methyl-1,3,5-triazine*

Following the procedure of Example 25, Part B, 2-allylamino-4-diallylamino-6-methyl-1,3,5-triazine (6.1 g.; 0.025 mole) was oxidized with m-chloroperbenzoic acid (91.5% pure; 9.4 g.; 0.05 mole) in 100 ml. of absolute ethanol. The reaction mixture was stirred for an additional 15 hours at 25° C. The reaction product was recrystallized twice from hexane to give 3.3 g. of 1,2-dihydro-1-hydroxy-2-allylimino-4-diallylamino-6-methyl-1,3,5-triazine in the form of a white solid which gave a reddish-brown color to ethanolic ferric chloride; M.P. 78–80° C. (sintered at 72° C.).

*Analysis.*—Calcd. for $C_{13}H_{19}N_5O$: C, 59.75; H, 7.33; N, 26.80; O, 6.12. Found: C, 60.08; H, 7.25; N, 26.01; O, 5.98. U.V.—($H_2O$) 223 m$\mu$ ($\epsilon=24,500$); 255 m$\mu$ ($\epsilon=15,900$); 301 m$\mu$ ($\epsilon=6,150$). (0.01 N $H_2SO_4$) 215 m$\mu$ ($\epsilon=21,500$); 228 m$\mu$ ($\epsilon=23,300$); 248 m$\mu$ (sh.) ($\epsilon=15,600$); 272 m$\mu$ (sh.) ($\epsilon=6,600$). (0.01 N KOH) 223 m$\mu$ ($\epsilon=24,500$); 255 m$\mu$ ($\epsilon=15,750$); 301 m$\mu$ ($\epsilon=6,050$). I.R.—(Principal bands; mineral oil mull) 3140, 3080, 1630, 1590, 1530, 1267, 1185, 1127 cm.$^{-1}$.

EXAMPLE 29

*Part A.—2-anilino-4-chloro-6-methyl-1,3,5-triazine*

Following the procedure of Example 28, Part A, 2,4-dichloro-6-methyl-1,3,5-triazine (16.4 g.; 0.10 mole) was reacted with aniline (18.6 g.; 0.20 mole) in 300 ml. of diethyl ether. There was obtained 23.4 g. of 2-anilino-4-chloro-6-methyl-1,3,5-triazine in the form of an off-white solid; M.P. 100–115° C. This material was not purified but was used directly in Part B below.

*Part B.—2-anilino-4-diallylamino-6-methyl-1,3,5-triazine*

Following the procedure of Example 28, Part B, 2-anilino-4-chloro-6-methyl-1,3,5-triazine (11.0 g.; 0.05 mole) was reacted with diallylamine (9.7 g.; 0.10 mole). The product was isolated from the water-diluted reaction mixture by extraction with four 200-ml. portions of chloroform. The combined extracts were washed twice with 100-ml. portions of water, and were dried with sodium sulfate. Evaporation of solvent and distillation of the residue at reduced pressure gave 10.7 g. of 2-anilino-4-diallylamino-6-methyl-1,3,5-triazine as a viscous yellow oil; B.P. 180–195° C. at 1.1 mm.

*Analysis.*—Calcd. for $C_{16}H_{19}N_5$: C, 68.30; H, 6.81; N, 24.89. Found: C, 68.48; H, 7.04; N, 24.65.

*Part C.—1,2-dihydro-1-hydroxy-4-diallylamino-6-methyl-2-phenylimino-1,3,5-triazine*

Following the procedure of Example 25, Part B, 2-anilino-4-diallylamino-6-methyl-1,3,5-triazine (10.5 g.; 0.037 mole) was oxidized with m-chloroperbenzoic acid (91.5% pure; 14.0 g.; 0.074 mole) in a mixture of 100 ml. of absolute ethanol and 100 ml. of methanol. The reaction mixture was stirred for an additional 15 hours at 25° C. The reaction product was recrystallized twice from hexane to give 2.1 g. of 1,2-dihydro-1-hydroxy-4-diallylamino-6-methyl-2-phenylimino-1,3,5-triazine in the form of tan needles which gave a dark brown ferric chloride test; M.P. 103–105° C.

*Analysis.*—Calcd. for $C_{16}H_{19}N_5O$: C, 64.62; H, 6.44; N, 23.55. Found: C, 64.91; H, 6.41; N, 23.53. U.V.—($H_2O$) 259 m$\mu$ ($\epsilon=24,200$); 304 m$\mu$ (sh.) ($\epsilon=5,150$). (0.01 N $H_2SO_4$) 208 m$\mu$ (end absorption); 251 m$\mu$ ($\epsilon=20,250$). (0.01 N KOH) 259 m$\mu$ ($\epsilon=24,100$); 305 m$\mu$ (sh.) ($\epsilon=5,250$). I.R.—(Principal bands; mineral oil mull) 3060, 3050, 1618, 1600, 1575, 1520, 1495, 1185, 1175, 750, 686 cm.$^{-1}$.

EXAMPLE 30

*Part A.—2-benzylamino-4-chloro-6-methyl-1,3,5-triazine*

Following the procedure of Example 28, Part A, 2,4-dichloro-6-methyl-1,3,5-triazine (16.4 g.; 0.10 mole) was reacted with benzylamine (21.45 g.; 0.20 mole) in 400 ml. of diethyl ether. Crystallization of the product from 500 ml. of hexane gave 17.55 g. of 2-benzylamino-4-chloro-6-methyl-1,3,5-triazine in the form of light-yellow needles; M.P. 98–100° C. (sintered at 95° C.).

*Analysis.*—Calcd. for $C_{11}H_{11}ClN_4$: N, 23.87. Found: N, 23.47. U.V.—(isooctane) 230 m$\mu$ ($\epsilon=19,350$); 256 m$\mu$ (sh.) ($\epsilon=2,300$). I.R.—(Principal bands; mineral oil mull) 3270, 3140, 3040, 1625, 1600, 1570, 1555, 1530, 1495, 1170, 1124, 727 cm.$^{-1}$.

*Part B.—2-benzylamino-4-diallylamino-6-methyl-1,3,5-triazine*

Following the procedure of Example 28, Part B, 2-benzylamino - 4 - chloro - 6 - methyl - 1,3,5 - triazine (11.7 g.; 0.05 mole) was reacted with diallylamine (9.7 g.; 0.10 mole). The solid which precipitated from the water-diluted reaction mixture was filtered and recrystallized from hexane to give 10.9 g. of 2-benzylamino-4-diallylamino-6-methyl-1,3,5-triazine in the form of off-white needles; M.P. 67–69° C.

*Analysis.*—Calcd. for $C_{17}H_{21}N_5$: C, 69.12; H, 7.17; N, 23.71. Found: C, 69.63; H, 7.01; N, 22.97. U.V.—($C_2H_5OH$) 226 mμ (ε=37,550); 265 mμ (ε=5,450). I.R.—(Principal bands; mineral oil mull) 3260, 3130, 3090, 1639, 1610, 1562, 1530, 1246, 1225, 734, 692 cm.$^{-1}$.

*Part C.—1,2-dihydro-1-hydroxy-2-benzylimino-4-diallylamino-6-methyl-1,3,5-triazine*

Following the procedure of Example 25, Part B, 2-benzylamino - 4 - diallylamino - 6 - methyl - 1,3,5 - triazine (7.4 g.; 0.025 mole) was oxidized with m-chloroperbenzoic acid (91.5% pure; 9.4 g.; 0.05 mole). The reaction mixture was stirred for an additional 15 hours at 25° C. Solvent was removed, and the reaction residue was treated with water and aqueous sodium hydroxide solution. The solid which precipitated was filtered and recrystallized twice from hexane to give 3.85 g. of 1,2-dihydro - 1 - hydroxy - 2 - benzylimino - 4 - diallylamino-6-methyl-1,3,5-triazine in the form of a white solid which gave a brown color to ethanolic ferric chloride; M.P. 84–86° C. (sintered at 75° C.).

*Analysis.*—Calcd. for $C_{17}H_{21}N_5O$: C, 65.57; H, 6.80; N, 22.49; O, 5.14. Found: C, 65.94; H, 7.45; N, 22.02; O, 5.89. U.V.—($H_2O$) 225 mμ (ε=25,150); 255 mμ (ε=15,750); 302 mμ (ε=6,100). (0.01 N $H_2SO_4$) 212 mμ (sh.) (ε=22,850); 218 mμ (ε=23,350); 227 mμ (ε=23,400); 248 mμ (sh.) (ε=16,000); 276 mμ (sh.) (ε=5,850). (0.01 N KOH) 225 mμ (ε=24,700); 255 mμ (ε=15,500); 302 mμ (ε=6,050). I.R.—(Principal bands; mineral oil mull) 3185, 3080, 3035, 1630, 1590, 1530, 1492, 1250, 1180, 765, 691 cm.$^{-1}$.

Following the procedure of Hirt et al., Helv. Chim. Acta 33, 1368 (1950) in reacting Grignard reagents with cyanuric chloride, using as the Grignard reagent, 2-naphthylmagnesium bromide;
pentylmagnesium chloride;
tert-butylmagnesium chloride;
cyclopentylmagnesium bromide;
2,4-dimethylphenylmagnesium bromide;
o-ethylphenethylmagnesium bromide;
2-methyl-3-pentenylmagnesium chloride;
4-fluoro-1-naphthylmethylmagnesium chloride; and
4-methyl-1-naphthylmagnesium bromide;
there are obtained 2,4-dichloro-6-(2-naphthyl)-1,3,5-triazine;
2,4-dichloro-6-pentyl-1,3,5-triazine;
2-tert-butyl-4,6-dichloro-1,3,5-triazine;
2-cyclopentyl-4,6-dichloro-1,3,5-triazine;
2,4-dichloro-6-(2,4-dimethylphenyl)-1,3,5-triazine;
2,4-dichloro-6-(o-ethylphenethyl)-1,3,5-triazine;
2,4-dichloro-6-(2-methyl-3-phentenyl)-1,3,5-triazine;
2,4-dichloro-6-(4-fluoro-1-naphthylmethyl)-1,3,5-triazine; and
2,4-dichloro-6-(4-methyl-1-naphthyl)-1,3,5-triazine, respectively.

Following the procedure of Example 28, Part A, but substituting for the combination of 2,4-dichloro-6-methyl-1,3,5-triazine and allylamine as reactants, one of the other dichloro-1,3,5-triazines listed above, in the order listed, and one of the following primary amines in the order listed: sec-butylamine; isopentylamine; octylamine; 4-hexenylamine; cyclooctylamine; 1-naphthylamine; phenethylamine; 4-phenylbutylamine; and 2-naphthylmethylamine, there are obtained 2-sec-butylamino-4-chloro-6-(2-naphthyl)-1,3,5-triazine;
2-chloro-4-isopentylamino-6-pentyl-1,3,5-triazine;
2-tert-butyl-4-chloro-6-octylamino-1,3,5-triazine;
2-chloro-4-cyclopentyl-6-(4-hexenylamino)-1,3,5-triazine;
2-chloro-4-cyclooctylamino-6-(2,4-dimethylphenyl)-1,3,5-triazine;
2-chloro-4-(o-ethylphenethyl)-6-(1-naphthylamino)-1,3,5-triazine;
2-chloro-4-(2-methyl-3-pentenyl)-6-phenethylamino-1,3,5-triazine;
2-chloro-4-(4-fluoro-1-naphthylmethyl)-6-(4-phenylbutylamino)-1,3,5-triazine; and
2-chloro-4-(4-methyl-1-naphthyl)-6-(2-naphthylmethylamino)-1,3,5-triazine, respectively.

Following the procedure of Example 28, Part B, but substituting for the combination of 2-allylamino-4-chloro-6-methyl-1,3,5-triazine and diallylamine as reactants, one of the other monochloro-1,3,5-triazines listed above, in the order listed, and one of the following secondary amines in the order listed:

diisobutylamine;
dioctylamine;
N-ethyl-4-pentenylamine;
azetidine;
heptamethylenimine;
octamethylenimine;
2,2-dimethylpyrrolidine;
2-methyl-5-ethylpiperidine; and
2,6-dimethyl-4-octylpiperidine, there are obtained 2-sec-butylamino-4-diisobutylamino-6-(2-naphthyl)-1,3,5-triazine;
2-dioctylamino-4-isopentylamino-6-pentyl-1,3,5-triazine;
2-tert-butyl-4-(N-ethyl-4-pentenylamino)-6-octylamino-1,3,5-triazine;
2-(1-azetidinyl)-4-cyclopentyl-6-(4-hexenylamino)-1,3,5-triazine;
2-cyclooctylamino-4-(2,4-dimethylphenyl)-6-(1-heptamethylenimino)-1,3,5-triazine;
2-(o-ethylphenethyl)-4-(1-naphthylamino)-6-(1-octamethylenimino)-1,3,5-triazine;
2-(2,2-dimethyl-1-pyrrolidinyl)-4-(2-methyl-3-pentenyl)-6-phenethylamino-1,3,5-triazine;
2-(4-fluoro-1-naphthylmethyl)-4-(2-methyl-5-ethylpiperidino-6-(4-phenylbutylamino)-1,3,5-triazine; and
2-(2,6-dimethyl-4-octylpiperidino)-4-(4-methyl-1-naphthyl)-6-(2-naphthylmethylamino)-1,3,5-triazine, respectively.

Following the procedures of Part B of Examples 1, 4, 15, or 25 but substituting for the 1,3,5-triazines used as reactants therein, one of the other diamino-1,3,5-triazines listed above, in the order listed, there are obtained 1,2-dihydro-1-hydroxy-2-sec-butylimino-4-diisobutylamino-6-(2-naphthyl)-1,3,5-triazine;
1,2-dihydro-1-hydroxy-4-dioctylamino-2-isopentylimino-6-pentyl-1,3,5-triazine;
1,2-dihydro-1-hydroxy-6-tert-butyl-4-(N-ethyl-4-pentenylamino)-2-octylimino-1,3,5-triazine;
1,2-dihydro-1-hydroxy-4-(1-azetidinyl)-6-cyclopentyl-2-(4-hexenylimino)-1,3,5-triazine;
1,2-dihydro-1-hydroxy-2-cyclooctylimino-6-(2,4-dimethylphenyl)-4-(1-heptamethylenimino)-1,3,5-triazine;
1,2-dihydro-1-hydroxy-6-o-ethylphenethyl-2-(1-naphthylimino)-4-(1-octamethylenimino)-1,3,5-triazine;
1,2-dihydro-1-hydroxy-4-(2,2-dimethyl-1-pyrrolidinyl)-6-(2-methyl-3-pentenyl)-6-phenethylimino-1,3,5-triazine;
1,2-dihydro-1-hydroxy-6-(4-fluoro-1-naphthylmethyl)-4-(2-methyl-5-ethylpiperidino)-2-(4-phenylbutylimino)-1,3,5-triazine; and
1,2-dihydro-1-hydroxy-4-(2,6-dimethyl-4-octylpiperidino)-6-(4-methyl-1-naphthyl)-2-(2-naphthylmethylimino)-1,3,5-triazine, respectively.

EXAMPLE 31

*1,2-dihydro-1-hydroxy-2-acetylimino-4-diallylamino-6-methyl-1,3,5-triazine*

Acetic anhydride (3 drops) was added with swirling to a suspension of 1,2-dihydro-1-hydroxy-4-diallylamino-2-imino-6-methyl-1,3,5-triazine (400 mg.) in 5 ml. of anhydrous diethyl ether. A clear solution formed rapidly, after which a crystalline solid precipitated. Filtration gave 450 mg. of 1,2-dihydro-1-hydroxy-2-acetylimino-4-diallylamino-6-methyl-1,3,5-triazine acetic acid addition salt; M.P. 91–92° C.

*Analysis.*—Calcd. for $C_{14}H_{21}N_5O_4$: C, 52.00; H, 6.55; N, 21.66. Found: C, 52.71; H, 6.47; N, 21.60. U.V.—($H_2O$) 235 m$\mu$ ($\epsilon$=15,750); 273 m$\mu$ ($\epsilon$=19,100); 314 m$\mu$ (sh.) ($\epsilon$=3,300). (0.01 N $H_2SO_4$) 227 m$\mu$ ($\epsilon$=18,950); 259 m$\mu$ ($\epsilon$=15,500); 318 m$\mu$ (sh.) ($\epsilon$=1,700). (0.01 N KOH) 262 m$\mu$ ($\epsilon$=24,350); 313 m$\mu$ ($\epsilon$=4,350). I.R.—(Principal bands; mineral oil mull) 3180, 3070, 1737, 1620, 1560, 1520, 1280, 1180 cm.$^{-1}$. N.M.R.—($CDCl_3$; in c.p.s. downfield from tetramethylsilane) C—$CH_3$, 156; $NCOCH_3$, 148; $CH_3COOH$, 119.

Addition of one molecular equivalent of triethylamine to an absolute ethanol solution of the above acetic acid addition salt, followed by evaporation and recrystallization from acetonitrile gives the free base form of 1,2-dihydro - 1 - hydroxy - 2 - acetylimino - 4 - diallylamino-6-methyl-1,3,5-triazine.

Addition of one molecular equivalent of hydrogen chloride to an absolute ethanol solution of the free base form of 1,2 - dihydro-1-hydroxy-2-acetylimino-4-diallylamino-6-methyl-1,3,5-triazine, followed by addition of several volumes of anhydrous diethyl ether, gives the corresponding hydrochloric acid addition salt. Using in place of the hydrogen chloride, benzoic acid; lactic acid; succinic acid; sulfuric acid; and phosphoric acid, the corresponding acid addition salts are obtained.

Following the procedure of Example 31 but using acetyl chloride in place of acetic anhydride, there is obtained 1,2 - dihydro - 1 - hydroxy - 2 - acetylimino - 4-diallylamino-6-methyl-1,3,5-triazine hydrochloric acid addition salt.

Also following the procedure of Example 31 but using in place of the acetic anhydride, propionic anhydride; crotonic anhydride; cyclohexanecarboxylic anhydride; isobutyryl chloride; decanoyl chloride; phenylacetyl chloride; 3-methoxybutyric anhydride; p-tert-butylcyclohexanecarbonyl chloride; and p-nitrophenylacetyl chloride, there are obtained 1,2-dihydro-1-hydroxy-4-diallylamino-6-methyl-2-propionylimino-1,3,5-triazine;
1,2-dihydro-1-hydroxy-2-crotonoylimino-4-diallylamino-6-methyl-1,3,5-triazine;
1,2-dihydro-1-hydroxy-2-cyclohexanecarbonylimino-4-diallylamino-6-methyl-1,3,5-triazine;
1,2-dihydro-1-hydroxy-4-diallylamino-2-isobutyrylimino-6-methyl-1,3,5-triazine;
1,2-dihydro-1-hydroxy-2-decanoylimino-4-diallylamino-6-methyl-1,3,5-triazine;
1,2-dihydro-1-hydroxy-4-diallylamino-6-methyl-2-phenylacetylimino-1,3,5-triazine;
1,2-dihydro-1-hydroxy-4-diallylamino-2-(3-methoxybutyrylimino)-6-methyl-1,3,5-triazine;
1,2-dihydro-1-hydroxy-2-(p-tert-butylcyclohexanecarbonylimino)-4-diallylamino-6-methyl-1,3,5-triazine; and
1,2-dihydro-1-hydroxy-4-diallylamino-6-methyl-2-(p-nitrophenylacetylimino)-1,3,5-triazine, respectively.

Also following the procedure of Example 31 but using in place of the 1,2-dihydro-1-hydroxy-4-diallylamino-2-imino-6-methyl-1,3,5-triazine reactant, 1,2-dihydro-1-hydroxy-4-diallylamino-2-imino-1,3,5-triazine;
1,2-dihydro-1-hydroxy-4-dipropylamino-2-imino-6-methyl-1,3,5-triazine;
1,2-dihydro-1-hydroxy-4-diallylamino-6-ethyl-2-imino-1,3,5-triazine;
1,2-dihydro-1-hydroxy-2-imino-6-methyl-4-morpholino-1,3,5-triazine;
1,2-dihydro-1-hydroxy-6-benzyl-4-diallylamino-2-imino-1,3,5-triazine;
1,2-dihydro-1-hydroxy-6-butyl-4-diallylamino-2-imino-1,3,5-triazine;
1,2-dihydro-1-hydroxy-6-cyclohexyl-4-diallylamino-2-imino-1,3,5-triazine;
1,2-dihydro-1-hydroxy-4-diallylamino-2-imino-6-phenyl-1,3,5-triazine;
1,2-dihydro-1-hydroxy-4-diallylamino-2-imino-6-(2-methoxyethyl)-1,3,5-triazine;
1,2-dihydro-1-hydroxy-4-diallylamino-2-imino-6-(2-methoxypropyl)-1,3,5-triazine;
1,2-dihydro-1-hydroxy-4-diallylamino-2-imino-6-vinyl-1,3,5-triazine;
1,2-dihydro-1-hydroxy-4-diallylamino-2-imino-6-propyl-1,3,5-triazine;
1,2-dihydro-1-hydroxy-4-diallylamino-2-imino-6-isopropyl-1,3,5-triazine;
1,2-dihydro-1-hydroxy-4-diallylamino-2-imino-6-pentyl-1,3,5-triazine;
1,2-dihydro-1-hydroxy-6-p-chlorobenzyl-4-diallylamino-2-imino-1,3,5-triazine;
1,2-dihydro-1-hydroxy-4-diallylamino-2-imino-6-phenethyl-1,3,5-triazine;
1,2-dihydro-1-hydroxy-4-diallylamino-2-imino-6-(3-phenylpropyl)-1,3,5-triazine; and
1,2-dihydro-1-hydroxy-6-cyclopropyl-4-diallylamino-2-imino-1,3,5-triazine, there are obtained 1,2-dihydro-1-hydroxy-4-diallylamino-2-acetylimino-1,3,5-triazine;
1,2-dihydro-1-hydroxy-4-dipropylamino-2-acetylimino-6-methyl-1,3,5-triazine;
1,2-dihydro-1-hydroxy-4-diallylamino-6-ethyl-2-acetylimino-1,3,5-triazine;
1,2-dihydro-1-hydroxy-2-acetylimino-6-methyl-4-morpholino-1,3,5-triazine;
1,2-dihydro-1-hydroxy-6-benzyl-4-diallylamino-2-acetylimino-1,3,5-triazine;
1,2-dihydro-1-hydroxy-6-butyl-4-diallylamino-2-acetylimino-1,3,5-triazine;
1,2-dihydro-1-hydroxy-6-cyclohexyl-4-diallylamino-2-acetylimino-1,3,5-triazine;
1,2-dihydro-1-hydroxy-4-diallylamino-2-acetylimino-6-phenyl-1,3,5-triazine;
1,2-dihydro-1-hydroxy-4-diallylamino-2-acetylimino-6-(2-methoxyethyl)-1,3,5-triazine;
1,2-dihydro-1-hydroxy-4-diallylamino-2-acetylimino-6-(2-methoxypropyl)-1,3,5-triazine;
1,2-dihydro-1-hydroxy-4-diallylamino-2-acetylimino-6-vinyl-1,3,5-triazine;
1,2-dihydro-1-hydroxy-4-diallylamino-2-acetylimino-6-propyl-1,3,5-triazine;
1,2-dihydro-1-hydroxy-4-diallylamino-2-acetylimino-6-isopropyl-1,3,5-triazine;
1,2-dihydro-1-hydroxy-4-diallylamino-2-acetylimino-6-pentyl-1,3,5-triazine;
1,2-dihydro-1-hydroxy-6-p-chlorobenzyl-4-diallylamino-2-acetylimino-1,3,5-triazine;
1,2-dihydro-1-hydroxy-4-diallylamino-2-acetylimino-6-phenethyl-1,3,5-triazine;
1,2-dihydro-1-hydroxy-4-diallylamino-2-acetylimino-6-(3-phenylpropyl)-1,3,5-triazine; and
1,2-dihydro-1-hydroxy-6-cyclopropyl-4-diallylamino-2-acetylimino-1,3,5-triazine; respectively, each in the form of the acetic acid addition salt. Each corresponding free base is obtained by neutralization of the acid addition salt with triethylamine as described above.

Also following the procedure of Example 31 but using in place of the 1,2-dihydro-1-hydroxy-4-diallylamino-2-imino-6-methyl-1,3,5-triazine reactant, each of the specific 1,2-dihydro-1-hydroxy-2-imino-1,3,5 - triazines mentioned above, and using in place of the acetic anhydride, each of the specific carboxyacylating agents mentioned above, there are obtained the corresponding 2-N-carboxyacylated 1,2-dihydro-1-hydroxy-1,3,5-triazines, in the form of the hydrochloric acid addition salt in the case of the carboxylic acid chloride agents, and in the form of the corresponding organic carboxylic acid addition salt in the case of the carboxylic acid anhydride agents. These acid addition salts are each transformed to the corresponding free base by neutralization with triethylamine as described above.

EXAMPLE 32

*1,2-dihydro-1-acetoxy-2-acetylimino-4-diallyl-amino-6-methyl-1,3,5-triazine*

Following the procedure of Example 31 but using one ml. of acetic anhydride, 15 ml. of diethyl ether, heating the resulting mixture under reflux for 4 hours, and evaporating under reduced pressure, there is obtained 1,2-dihydro - 1 - acetoxy - 2 - acetylimino - 4 - diallylamino-6-methyl-1,3,5-triazine acetic acid addition salt. The corresponding free base is obtained by neutralization of the acid addition salt with triethylamine as described above.

Following the procedure of Example 32 but using in place of acetic anhydride, propionic anhydride; crotonic anhydride; cyclohexanecarboxylic anhydride; 3-methoxybutyric anhydride; and furoic anhydride, there are obtained 1,2-dihydro-1-propionyloxy-4-diallylamino-6-methyl-2-propionylimino-1,3,5-triazine;

1,2-dihydro-1-crotonoyloxy-2-crotonoylimino-4-diallylamino-6-methyl-1,3,5-triazine;

1,2-dihydro-1-cyclohexanecarbonyloxy-2-cyclohexanecarbonylimino-4-diallylamino-6-methyl-1,3,5-triazine;

1,2-dihydro-1-(3-methoxybutyryloxy)-4-diallylamino-2-(3-methoxybutyrylimino)-6-methyl-1,3,5-triazine; and 1,2-dihydro-1-furoyloxy-4-diallylamino-2-furoylimino-6-methyl-1,3,5-triazine, respectively, in the form of the corresponding acid addition salt. Each acid addition salt is transformed to the corresponding free base by neutralization with triethylamine as described above.

Also following the procedure of Example 32 but using in place of the 1,2-dihydro-1-hydroxy-4-diallylamino-2-imino-6-methyl-1,3,5-triazine reactant, each of the 1,2-dihydro - 1 - hydroxy - 2 - imino - 1,3,5 - triazines mentioned above, there are obtained the corresponding 1,2-dihydro - 1 - acetoxy - 2 - acetylimino - 1,3,5 - triazines in the form of the acetic acid addition salts, each of which is transformed to the corresponding free base by neutralization with triethylamine as described above.

I claim:

1. A compound selected from the group consisting of the free base form and acid addition salts of a compound of the formula:

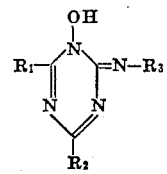

wherein $R_1$ is selected from the group consisting of hydrogen, lower alkyl, lower alkenyl, lower alkoxyalkyl, lower cycloalkyl, lower aryl, lower alkaryl, lower aralkyl, lower alkaralkyl, lower alkoxyaralkyl, and lower haloaralkyl; wherein $R_2$ is selected from the group consisting of di-lower-alkylamino, di-lower-alkenylamino, N-lower-alkyl-lower-alkenylamino, and the heterocyclic moieties, aziridinyl, azetidinyl, pyrrolidinyl, piperidino, hexahydroazepinyl, heptamethylenimino, octamethylenimino, and morpholino, each of said heterocyclic moieties having attached as substituents on carbon atoms thereof zero to 3 lower alkyls, inclusive, the nitrogen atom of $R_2$ being the point of attachment of $R_2$ to the ring in said formula; and wherein $R_3$ is selected from the group consisting of hydrogen, lower alkyl, lower alkenyl, lower cycloalkyl, lower aryl, and lower aralkyl.

2. A compound selected from the group consisting of the free base form and acid addition salts of a compound of the formula:

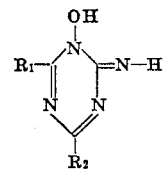

wherein $R_1$ is selected from the group consisting of hydrogen, lower alkyl, lower alkenyl, lower alkoxyalkyl, lower cycloalkyl, lower aryl, lower alkaryl, lower aralkyl, lower alkaralkyl, lower alkoxyaralkyl, and lower haloaralkyl; and wherein $R_2$ is selected from the group consisting of di-lower-alkylamino, di-lower-alkenylamino, N-lower - alkyl - lower - alkenylamino, and the heterocyclic moieties, aziridinyl, azetidinyl, pyrrolidinyl, piperidino, hexahydroazepinyl, heptamethylenimino, octamethylenimino, and morpholino, each of said heterocyclic moieties having attached as substituents on carbon atoms thereof zero to 3 lower alkyls, inclusive, the nitrogen atom of $R_2$ being the point of attachment of $R_2$ to the ring in said formula.

3. A compound selected from the group consisting of the free base form and acid addition salts of a compound of the formula:

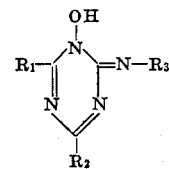

wherein $R_1$ is selected from the group consisting of hydrogen, lower alkyl, lower alkenyl, lower alkoxyalkyl, lower cycloalkyl, lower aryl, lower alkaryl, lower aralkyl, lower alkaralkyl, lower alkoxyaralkyl, and lower haloaralkyl; wherein $R_2$ is di-lower-alkenylamino; and wherein $R_3$ is selected from the group consisting of hydrogen, lower alkyl, lower alkenyl, lower cycloalkyl, lower aryl, and lower aralkyl.

4. A compound selected from the group consisting of the free base form and acid addition salts of a compound of the formula:

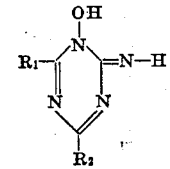

wherein $R_1$ is selected from the group consisting of hydrogen, lower alkyl, lower alkenyl, lower alkoxyalkyl, lower cycloalkyl, lower aryl, lower alkaryl, lower aralkyl, lower alkaralkyl, lower alkoxyaralkyl, and lower haloaralkyl; and wherein $R_2$ is di-lower-alkenylamino.

5. 1,2 - dihydro - 1 - hydroxy - 4 - diallylamino - 2 - imino-1,3,5-triazine.

6. 1,2 - dihydro - 1 - hydroxy - 4 - diallylamino - 2 - imino-6-methyl-1,3,5-triazine 7. 1,2 - dihydro - 1 - hydroxy - 4 - dipropylamino - 2-imino-6-methyl-1,3,5-triazine.

8. 1,2-dihydro - 1 - hydroxy - 4 - diallylamino - 6 - ethyl-2-imino-1,3,5-triazine.

9. 1,2-dihydro - 1 - hydroxy-2-imino-6-methyl-4-morpholino-1,3,5-triazine.

10. 1,2-dihydro - 1 - hydroxy-6-benzyl-4-diallylamino-2-imino-1,3,5-triazine.

11. 1,2-dihydro - 1 - hydroxy-6-butyl-4-diallylamino-2-imino-1,3,5-triazine.

12. 1,2-dihydro - 1 - hydroxy - 6 - cyclohexyl-4-diallylamino-2-imino-1,3,5-triazine.

13. 1,2-dihydro - 1 - hydroxy-4-diallylamino-2-imino-6-phenyl-1,3,5-triazine.

14. 1,2-dihydro - 1 - hydroxy-4-diallylamino-2-imino-6-(2-methoxyethyl)-1,3,5-triazine.

15. 1,2-dihydro - 1 - hydroxy-4-diallylamino-2-imino-6-(2-methoxypropyl)-1,3,5-triazine.

16. 1,2-dihydro - 1 - hydroxy-4-diallylamino-2-imino-6-vinyl-1,3,5-triazine.

17. 1,2-dihydro - 1 - hydroxy-4-diallylamino-2-imino-6-propyl-1,3,5-triazine.

18. 1,2-dihydro - 1 - hydroxy-4-diallylamino-2-imino-6-isopropyl-1,3,5-triazine.

19. 1,2-dihydro - 1 - hydroxy-4-diallylamino-2-imino-6-pentyl-1,3,5-triazine.

20. 1,2-dihydro - 1 - hydroxy-6-p-chlorobenzyl-4-diallylamino-2-imino-1,3,5-triazine.

21. 1,2-dihydro - 1 - hydroxy-4-diallylamino-2-imino-6-phenethyl-1,3,5-triazine.

22. 1,2-dihydro - 1 - hydroxy-4-diallylamino-2-imino-6-(3-phenylpropyl)-1,3,5-triazine.

23. 1,2 - dihydro - 1 - hydroxy-6-cyclopropyl-4-diallylamino-2-imino-1,3,5-triazine.

24. 1,2-dihydro - 1 - hydroxy - 2 - allylimino-4-diallylamino-6-methyl-1,3,5-triazine.

25. 1,2-dihydro - 1 - hydroxy-4-diallylamino-6-methyl-2-phenylimino-1,3,5-triazine.

26. 1,2-dihydro - 1 - hydroxy-2-benzylimino-4-diallylamino-6-methyl-1,3,5-triazine.

27. A compound of the formula:

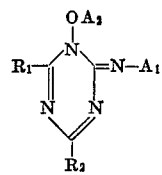

wherein $R_1$ is selected from the group consisting of hydrogen, lower alkyl, lower alkenyl, lower alkoxyalkyl, lower cycloalkyl, lower aryl, lower alkaryl, lower aralkyl, lower alkaralkyl, lower alkoxyaralkyl, and lower haloaralkyl; wherein $R_2$ is selected from the group consisting of di-lower-alkylamino, di-lower-alkenylamino, N-lower-alkyl-lower-alkenylamino, and the heterocyclic moieties, aziridinyl, azetidinyl, pyrrolidinyl, piperidino, hexahydroazepinyl, heptamethylenimino, octamethylenimino, and morpholino, each of said heterocyclic moieties having attached as substituents on carbon atoms thereof zero to 3 lower alkyls, inclusive, the nitrogen atom of $R_2$ being the point of attachment of $R_2$ to the ring in said formula; wherein $A_1$ is carboxyacyl, and wherein $A_2$ is selected from the group consisting of hydrogen and carboxyacyl.

28. 1,2-dihydro - 1 - hydroxy - 2 - acetylimino-4-diallylamino-6-methyl-1,3,5-triazine.

29. 1,2 - dihydro - 1 - hydroxy-2-acetylimino-4-diallylamino-6-methyl-1,3,5-triazine acetic acid addition salt.

References Cited by the Examiner

UNITED STATES PATENTS 3,093,645   6/1963   Shaw _____ 260—249.9

OTHER REFERENCES

Fuson: "Reactions of Organic Compounds," Wiley and Sons, Inc., New York (1962), pp. 336–7.

Morrison and Boyd: "Organic Chemistry," Allyn and Bacon, Inc., Boston (1959), pp. 474, 480–1.

WALTER A. MODANCE, *Primary Examiner.*

JOHN M. FORD, *Assistant Examiner.*